(12) United States Patent
Fry et al.

(10) Patent No.: US 12,328,413 B2
(45) Date of Patent: Jun. 10, 2025

(54) SYSTEMS AND METHODS TO PROVIDE REMOTE SUPPORT SERVICES TO A TESTING DEVICE

(71) Applicant: Illinois Tool Works Inc., Glenview, IL (US)

(72) Inventors: Justin Fry, Cranston, RI (US); Christopher Jackson, Millis, MA (US); Kylie Sauter, Franklin, MA (US)

(73) Assignee: Illinois Tool Works Inc., Glenview, IL (US)

( * ) Notice: Subject to any disclaimer, the term of this patent is extended or adjusted under 35 U.S.C. 154(b) by 0 days.

(21) Appl. No.: 18/600,341

(22) Filed: Mar. 8, 2024

(65) Prior Publication Data
US 2024/0267462 A1 Aug. 8, 2024

Related U.S. Application Data

(63) Continuation of application No. 16/964,110, filed as application No. PCT/US2018/016183 on Jan. 31, 2018, now abandoned.

(51) Int. Cl.
*G01N 3/62* (2006.01)
*G01N 3/06* (2006.01)
*H04M 3/51* (2006.01)

(52) U.S. Cl.
CPC .............. *H04M 3/51* (2013.01); *G01N 3/068* (2013.01); *G01N 3/62* (2013.01)

(58) Field of Classification Search
CPC ........... H04M 3/51; G01N 3/068; G01N 3/62; G06Q 10/20
USPC ........ 705/305; 73/1.08, 1.05, 788–840, 1.89, 73/78–82; 702/33, 34, 41–44
See application file for complete search history.

(56) References Cited

U.S. PATENT DOCUMENTS

| | | |
|---|---|---|
| 5,111,688 A | 5/1992 | Houghton |
| 5,911,164 A | 6/1999 | McRae |
| 8,825,423 B1 | 9/2014 | Brovold |

(Continued)

FOREIGN PATENT DOCUMENTS

| | | |
|---|---|---|
| CN | 1694405 | 11/2005 |
| CN | 101989981 | 3/2011 |
| CN | 102164164 | 8/2011 |

(Continued)

OTHER PUBLICATIONS

Ametek® Sensors, Test and Calibration, Part No. 01/5009, CS2-225 & CS2-1100, Force Tester User Manual, Sep. 2017 (112 pgs.)

(Continued)

*Primary Examiner* — Robert R Raevis
(74) *Attorney, Agent, or Firm* — McAndrews, Held & Malloy, Ltd.

(57) ABSTRACT

Systems and methods to provide remote support services to a testing device are disclosed. An example testing device includes a computing device configured to obtain a measurement value related to the material or component under test. The computing device includes: a display; an input device; a processor; and a memory coupled to the processor and storing computer readable instructions which, when executed by the processor, cause the processor to: in response to first input via the input device, transmit a request for a technical support service to a remote computing system; perform, at the computing device, one or more remote service actions associated with the technical support service.

17 Claims, 14 Drawing Sheets

(56) References Cited

U.S. PATENT DOCUMENTS

| | | |
|---|---|---|
| 9,103,758 B1 | 8/2015 | Frisch |
| 2014/0102211 A1 | 4/2014 | Schulz |

FOREIGN PATENT DOCUMENTS

| | | |
|---|---|---|
| CN | 102823195 | 12/2012 |
| CN | 103930877 | 7/2014 |
| CN | 104584009 | 4/2015 |
| CN | 107479721 | 12/2017 |
| JP | 2003315343 | 11/2003 |
| JP | 2017173083 | 9/2017 |
| WO | 2013177149 | 11/2013 |

OTHER PUBLICATIONS

European Examination Report Appln No. 18705282.4 dated Jul. 10, 2022.
Int'l Search Report and Written Opinion for PCT/US2018/016183 mailed Jun. 19, 2018 (12 pgs.)
Starrett® PKG08807-UML1 Software for Basic Force MKeasurement User Manual, Sep. 2017 (56 pgs).
Non-Final Office Action Appln No. 16/964, 110 dated Sep. 8, 2023.

Remote Connection

Message center — 706

| ID  | Time | Message |
|-----|------|---------|
| 310 | 12/11/2017 1:36:21 PM | Calibrations are out of date, contact service provider to schedule a visit. |
| 205 | 12/11/2017 1:36:21 PM | There is a new software update available: 4.04.22702 |
| 105 | 12/11/2017 1:36:21 PM | Successfully connected to Remote Connection. |

[Submit request] [Upload files] [Request calibrations]

Submit Request — 704

- First name: [Test] ✗
- Last name: [Operator] ✗
- Phone number: [XXX.555.1234] ✗
- Email address: [Test_Operator@testing.com] ✗
- Message:

728

[Submit] — 730

System status

- System ID: A123456B — 718
- Software version: 4.03.22149 — 716
- Calibrations expire: 7/28/2017 — 712
- Service agreement: Warranty — 720

✓ Remote Connection — 708
✗ Calibrations — 710
✗ Software — 714
✗ Remote access — 722

— 702
724 — [Download]
[Enable] — 726

[Close]

SYSTEMS AND METHODS TO PROVIDE REMOTE SUPPORT SERVICES TO A TESTING DEVICE

BACKGROUND

This disclosure relates generally to mechanical testing, and more particularly, to systems and methods to provide remote support services to a testing device.

Universal testing machines are used to perform mechanical testing, such as compression strength testing or tension strength testing, on materials or components.

SUMMARY

Systems and methods to provide remote support services to a testing device are disclosed, substantially as illustrated by and described in connection with at least one of the figures, as set forth more completely in the claims.

BRIEF DESCRIPTION OF THE DRAWINGS

These and other features, aspects, and advantages of the present disclosure will become better understood when the following detailed description is read with reference to the accompanying drawings in which like characters represent like parts throughout the drawings, wherein:

FIG. 7 illustrates an example remote service user interface that may be displayed at the testing device of FIGS. 1 and 2 and which includes status information about the testing device.

FIG. 10 illustrates an example remote service user interface that may be displayed at a computing device associated with a remote computing system.

The figures are not necessarily to scale. Wherever appropriate, similar or identical reference numerals are used to refer to similar or identical components.

DETAILED DESCRIPTION

Figure 1:
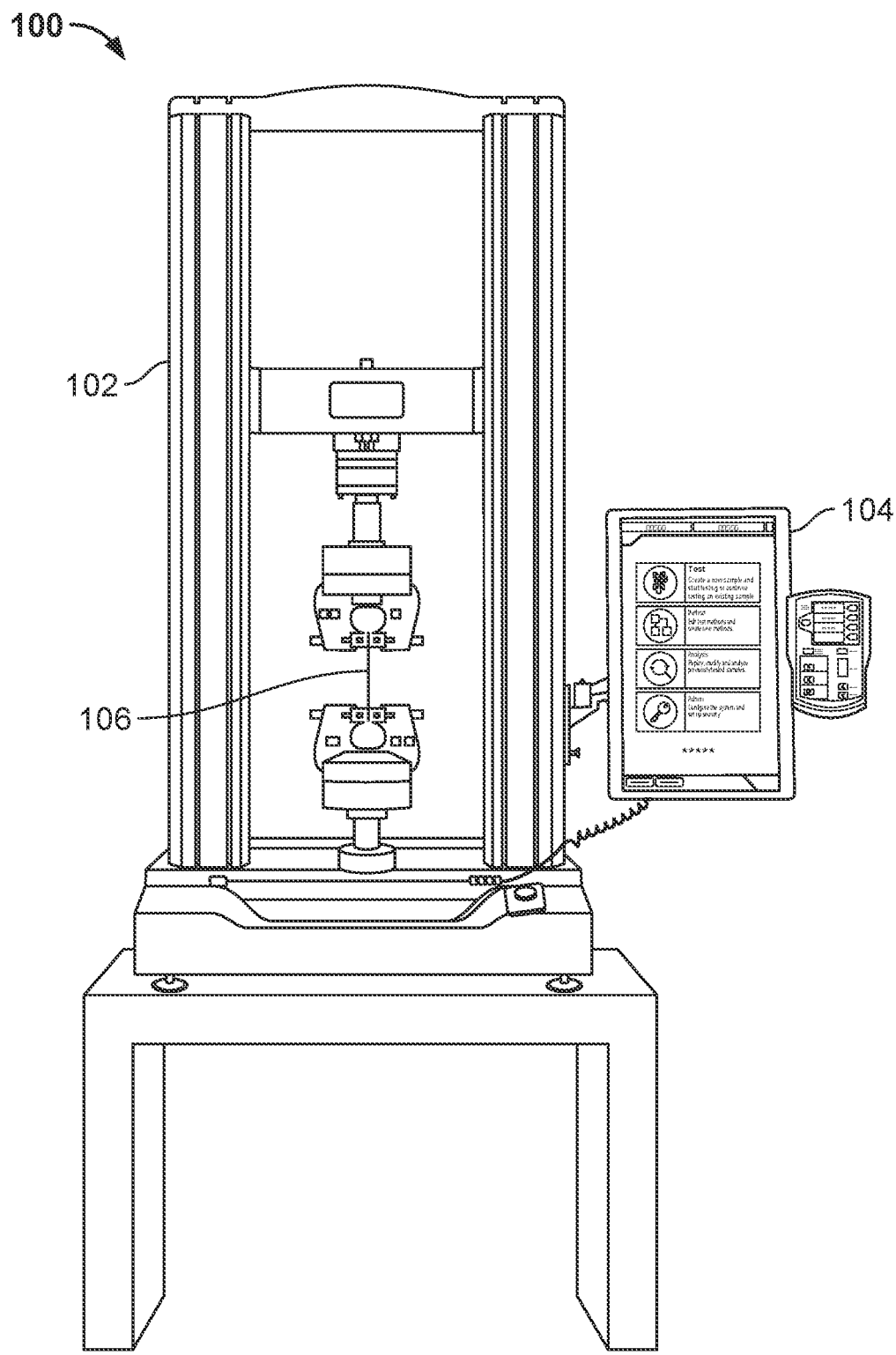
FIG. 1 is an example testing device to perform mechanical property testing, in accordance with aspects of this disclosure.

When a conventional mechanical testing device is not operating as desired, the operator (or other personnel associated with the testing device) may contact a manufacturer or distributor of the testing device in an attempt to troubleshoot the operational issue. For troubleshooting conventional testing systems, contact between the service personnel and the testing device operator often involves multiple, separate contacts such as phone calls, emails, text chats, and/or other steps to provide the complete set of information needed by the service personnel to resolve the issue to the satisfaction of the operator. Such multiple steps can be a source of frustration to the operator and/or reduces uptime of the testing device for performing mechanical tests. Furthermore, if a resolution of the issue cannot be accomplished with remote service personnel, an in-person service visit may be required, which increases the service costs to the owner of the testing device and/or to the provider of the support services.

Disclosed example systems and methods enable useful remote support services to be requested directly from the testing device and/or provided directly at the testing device. Some example systems and methods include enabling service personnel to initiate a real-time support session with the testing device. Example real-time support sessions may include audio calls, audiovisual conferencing, screen sharing by the testing device with remote service personnel, and/or remote desktop control by remote service personnel. In some examples, the service personnel is provided with relevant information about the testing device to aid in rapid resolution of issues.

Disclosed examples reduce the time and cost involved in having remote service personnel resolve issues or otherwise assist testing device operators. Disclosed examples also enable other value-added services to testing device owners and/or operators, such as providing notifications as to calibration and/or service contract status, scheduling calibration service, providing notifications regarding available updates to software and/or firmware installed at the testing device, reducing the time and effort needed to request technical support services by enabling requests from the testing device, and/or easily selecting and uploading files or other data to the remote service provider for use in resolving issues.

Disclosed example testing devices to measure a mechanical property of a material or component include a computing device to obtain a measurement value related to the material or component under test. The computing device includes a display, an input device, a processor, and a memory coupled to the processor. The memory stores computer readable instructions which, when executed by the processor, cause the processor to: in response to first input via the input device, transmit a request for a technical support service to a remote computing system; and perform, at the computing device, one or more remote service actions associated with the technical support service.

In some examples, the computer readable instructions cause the processor to transmit, to the remote computing system, information associated with the one or more remote service actions. In some such examples, the information associated with the one or more remote service actions includes at least one of a testing device calibration status, a software version, a serial number of the testing device, operator contact information associated with the testing device, or a service agreement status.

In some example testing devices, the computer readable instructions cause the processor to: present, via the display, an interface representative of a file system stored on the computing device that permits an operator to select one or more files from the file system; and in response to a designated input via the input device, transmit the selected one or more files to the remote computing system.

Some example testing devices include a microphone and a speaker, in which the computer readable instructions cause the processor to establish, with a second computing system identified in the support call initiation message, at least one of an audio connection or a remote control connection. In some examples, the computer readable instructions cause the processor to enter the support call reception mode by transmitting a request message to the remote computing system, in which the support call initiation message is a response to the request. In some examples, the request includes an Internet protocol (IP) request message.

In some examples, the computer readable instructions cause the processor to establish the audio connection by establishing a voice over Internet protocol (VOIP) session. In some examples, the computer readable instructions cause the processor to establish the remote control connection by establishing an application sharing protocol session via the remote computing system. In some examples, the computer readable instructions further cause the processor to: enter a support call reception mode in which the processor can receive a support call initiation message from the remote computing system; and in response to receiving the support call initiation message, display an inbound call alert on the display, the instructions to cause the processor to establish the at least one of the audio connection or the remote control connection in response to receiving, while the inbound call alert is active, an input associated with acceptance of a support call associated with the support call initiation message.

In some examples, the testing device is configured to test, for a material under test, at least one of a tensile strength, a compression strength, a flexural strength, a shear strength, an impact strength, a torsional strength, or an adhesion strength. In some example testing devices, the computer readable instructions cause the processor to access a communication received from the remote computing system and associated with the request, in which the communication identifies the one or more remote service actions to be performed on the computing device, and the instructions cause the processor to perform the one or more remote service actions in response to second input via the user input device.

In some examples, the request for the technical support service includes at least one of: a request for a software update for the testing device or a request for a live support session. In some examples, the processor, in response to logging in an operator at the computing device, transmits data associated with the testing device to the remote computing system.

In some example testing devices, the computer readable instructions cause the processor to, prior to the request for the technical support service, establish a data connection to the remote computing system. In some examples, the request for the technical support service includes at least one of an identifier of the testing device or an identifier associated with the data connection established between the testing device and the remote computing system.

In some examples, the computer readable instructions cause the processor to determine a calibration status of the testing device and, in response to determining that the testing device is due for calibration based on the calibration status, display a notification on the display associated with the calibration status. In some such examples, the processor, in response to receiving an input via the input device, displays an interface to enable an operator of the computing device to schedule a calibration for the testing device.

Disclosed example testing devices to measure a mechanical property of a material or component include a computing device configured to obtain a measurement value related to the material or component under test. The computing device includes: a display; an input device; a processor; and a memory coupled to the processor and storing computer readable instructions. The instructions, when executed by the processor, cause the processor to: determine a calibration status of the testing device; and in response to determining that the testing device is due for calibration based on the calibration status, display a notification on the display associated with the calibration status.

FIG. 1 is an example testing device 100 to perform mechanical property testing. The example testing device 100 may be, for example, a universal testing system capable of static mechanical testing. The testing device 100 may perform, for example, compression strength testing, tension strength testing, shear strength testing, bend strength testing, deflection strength testing, tearing strength testing, peel strength testing (e.g., strength of an adhesive bond), and/or any other compressive, tensile, torsion, thermal, and/or impact testing. Additionally or alternatively, the testing device 100 may perform dynamic testing.

The example testing device 100 includes a test fixture 102 and a computing device 104 communicatively coupled to the test fixture 102. The test fixture 102 applies loads to a material under test 106 and measures the mechanical properties of the test, such as displacement of the material under test 106 and/or force applied to the material under test 106.

The example computing device 104 may be used to configure the test fixture 102, control the test fixture 102, and/or receive measurement results from the test fixture 102 for processing, display, reporting, and/or any other desired purposes.

Figure 2:
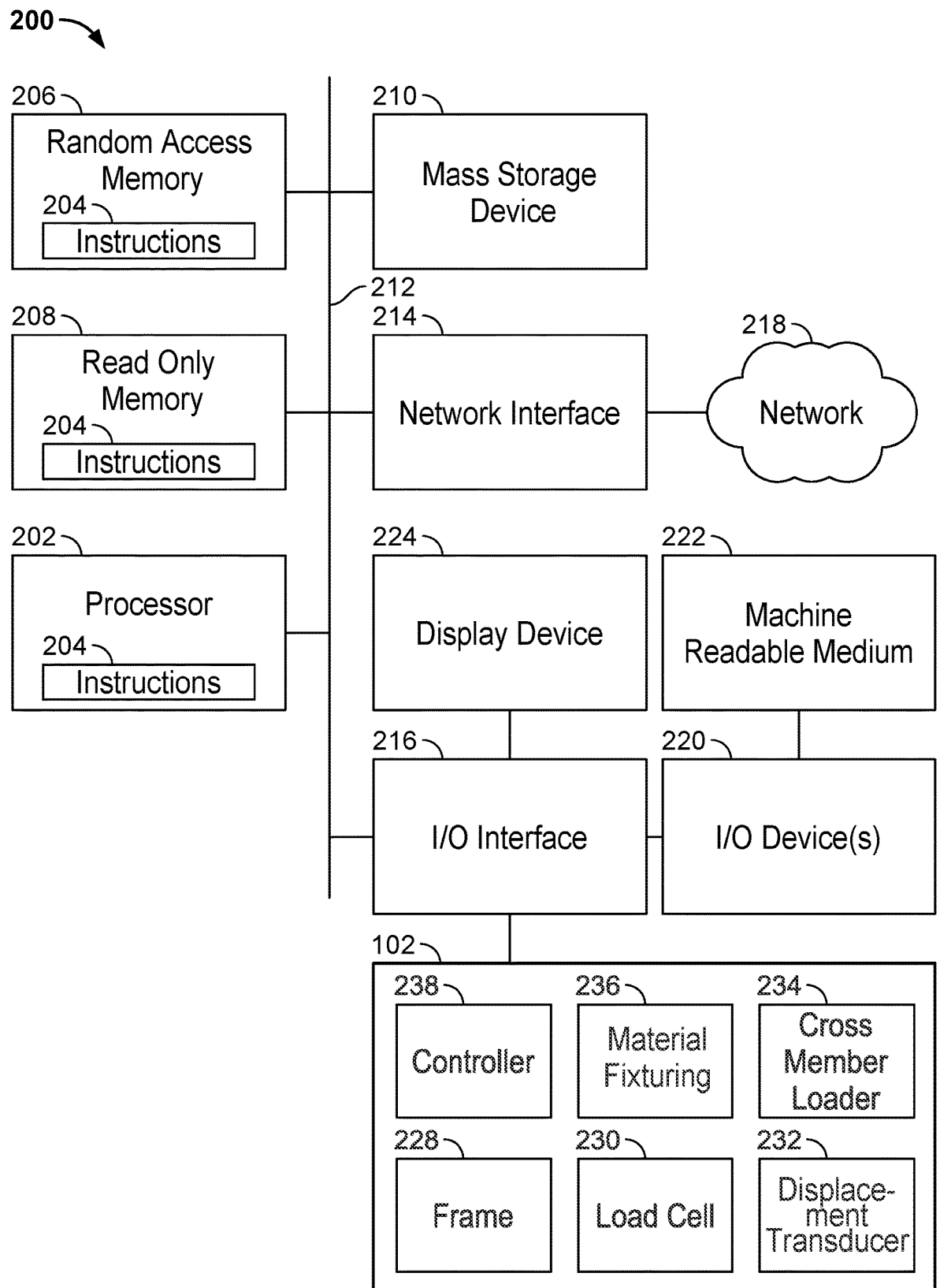
FIG. 2 is a block diagram of an example implementation of the testing device of FIG. 1.

FIG. 2 is a block diagram of an example computing system 200 that may be used to implement the testing device 100 of FIG. 1. The example testing device 100 of FIG. 2 includes the test fixture 102 and the computing device 104. The example computing device 104 may be a general-purpose computer, a laptop computer, a tablet computer, a mobile device, a server, an all-in-one computer, and/or any other type of computing device.

The example computing system 200 of FIG. 2 includes a processor 202. The example processor 202 may be any general purpose central processing unit (CPU) from any manufacturer. In some other examples, the processor 202 may include one or more specialized processing units, such as RISC processors with an ARM core, graphic processing units, digital signal processors, and/or system-on-chips (SoC). The processor 202 executes machine readable instructions 204 that may be stored locally at the processor (e.g., in an included cache or SoC), in a random access memory 206 (or other volatile memory), in a read only memory 208 (or other non-volatile memory such as FLASH memory), and/or in a mass storage device 210. The example mass storage device 210 may be a hard drive, a solid state storage drive, a hybrid drive, a RAID array, and/or any other mass data storage device.

A bus 212 enables communications between the processor 202, the RAM 206, the ROM 208, the mass storage device 210, a network interface 214, and/or an input/output interface 216.

The example network interface 214 includes hardware, firmware, and/or software to connect the computing system 200 to a communications network 218 such as the Internet. For example, the network interface 214 may include IEEE 802.X-compliant wireless and/or wired communications hardware for transmitting and/or receiving communications.

The example I/O interface 216 of FIG. 2 includes hardware, firmware, and/or software to connect one or more input/output devices 220 to the processor 202 for providing input to the processor 202 and/or providing output from the processor 202. For example, the I/O interface 216 may include a graphics processing unit for interfacing with a display device, a universal serial bus port for interfacing with one or more USB-compliant devices, a FireWire, a field bus, and/or any other type of interface. The example testing device 100 includes a display device 224 (e.g., an LCD screen) coupled to the I/O interface 216. Other example I/O device(s) 220 may include a keyboard, a keypad, a mouse, a trackball, a pointing device, a microphone, an audio speaker, a display device, an optical media drive, a multi-touch touch screen, a gesture recognition interface, a magnetic media drive, and/or any other type of input and/or output device.

The example computing system 200 may access a non-transitory machine readable medium 222 via the I/O interface 216 and/or the I/O device(s) 220. Examples of the machine readable medium 222 of FIG. 2 include optical discs (e.g., compact discs (CDs), digital versatile/video discs (DVDs), Blu-ray discs, etc.), magnetic media (e.g., floppy disks), portable storage media (e.g., portable flash drives, secure digital (SD) cards, etc.), and/or any other type of removable and/or installed machine readable media.

The example testing device 100 of FIG. 1 further includes the test fixture 102 coupled to the computing system 200. In the example of FIG. 2, the test fixture 102 is coupled to the computing device via the I/O interface 216, such as via a USB port, a Thunderbolt port, a FireWire (IEEE 1394) port, and/or any other type serial or parallel data port. In some other examples, the test fixture 102 is coupled to the network interface 214 via a wired or wireless connection, either directly or via the network 218.

The test fixture 102 of FIG. 2 includes a frame 228, a load cell 230, a displacement transducer 232, a cross member loader 234, material fixtures 236, and a controller 238. The test fixture 102 may include any number of other transducers, based on the type(s) of mechanical tests that the test fixture 102 is capable of performing. Other test fixtures may be dynamic test fixtures and/or include different test equipment, while including appropriate transducers that produce test data and may be controlled via the computing device 104.

The frame 228 provides rigid structural support for the other components of the test fixture 102 that perform the test. The load cell 230 measures force applied to a material under test by the cross-member loader 234 via the material fixtures 236. The cross-member loader 234 applies force to the material under test, while the material fixtures 236 (e.g., grips or other fixturing) grasp or otherwise couple the material under test to the cross-member loader 234. Example material fixtures 236 include grips, jaws, jigs, anvils, compression platens, or other types of fixtures, depending on the mechanical property being tested and/or the material under test.

The example controller 238 communicates with the computing device 104 to, for example, receive test parameters from the computing device 104 and/or report measurements and/or other results to the computing device 104. For example, the controller 238 may include one or more communication or I/O interfaces to enable communication with the computing device 104. The controller 238 may control the cross-member loader 234 to increase or decrease applied force, control the fixture(s) 236 to grasp or release a material under test, and/or receive measurements from the displacement transducer 232, the load cell 230, and/or any other transducer(s).

Figure 3:
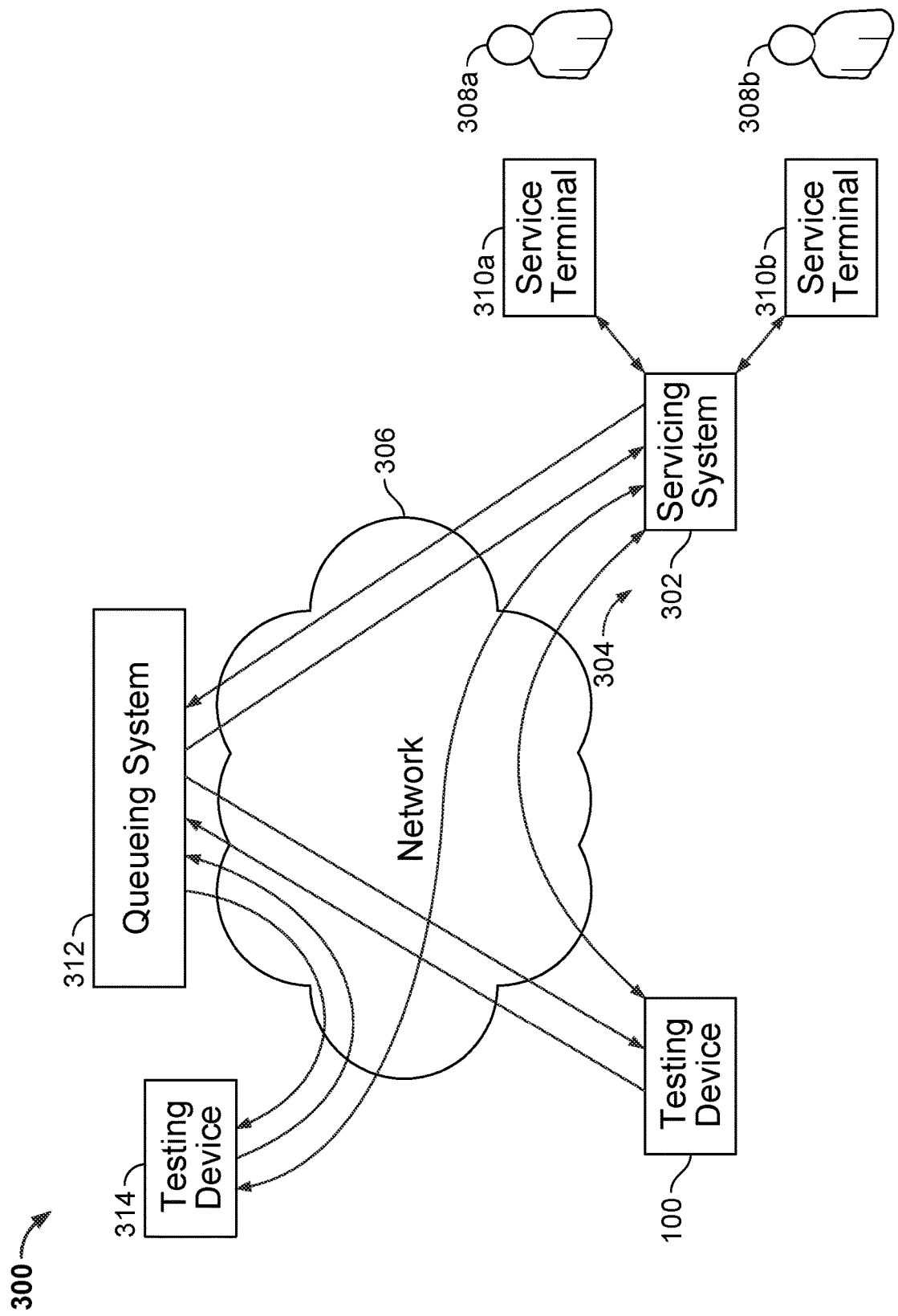
FIG. 3 is a block diagram of an example system including the testing device of FIGS. 1 and 2 and a servicing system, in accordance with aspects of this disclosure.

FIG. 3 is a block diagram of an example system 300 including the testing device 100 of FIGS. 1 and 2 and a servicing system 302. The servicing system 302 is communicatively connected to the testing device 100 from a remote location 304 to perform remote service actions, via the connection, at the testing device 100. The example system 300 includes one or more communications networks 306, such as the public Internet, a private network, or some combination of public and private networks (e.g., virtual networks).

The example servicing system 302 may be used to communicatively connect support or service personnel 308a, 308b with the testing device 100 via service terminals 310a, 310b. For example, the service personnel 308a, 308b may be service technicians who are trained to assist with technical service requests by users of the testing device 100. Instead of necessitating on-site visits for equipment or training issues experienced by operators of the testing device 100, the service personnel 308a, 308b may, via the service terminals 310a, 310b, receive data files and/or status information from the testing device 100, establish an audio connection with the testing device 100 (e.g., to talk to an operator proximate the testing device 100), establish an application sharing protocol session with the testing device 100 (e.g., to receive inputs and/or outputs from the software of the testing device 100), and/or perform other remote service actions at the testing device 100 from a remote location.

In the example of FIG. 3, the system 300 includes a queueing system 312 that receives information from the testing device 100 and/or any other testing devices 314 configured to enable remote support actions. The testing devices(s) 314 may be identical, similar, or different than the example testing device 100. The example queueing system 312 separately identifies the example testing devices 100, 314, such as identifying the testing devices 100, 314 using unique system identifiers (e.g., serial numbers), unique connection identifiers (e.g., session identifiers), and/or any other method of separately identifying (e.g., uniquely identifying) different systems.

In some examples, the queueing system 312 maintains one or more databases storing information associated with the testing devices 100, 314, and provides relevant information to the servicing system 302 when the testing devices 100, 314 transmit requests for information to the queueing system 312. Example information that may be stored by the queueing system 312 may include unique system identifiers of the testing devices 100, 314, session identifiers associated with the testing devices 100, 314, contact information of personnel associated with the testing devices 100, 314, diagnostic data associated with the testing devices 100, 314 (e.g., voltages, temperatures, machine cycles, machine travel, etc.), physical location information for the testing devices 100, 314, testing device software information, current software version information, service and support history for the testing devices 100, 314, testing device model information (e.g., model numbers, manufacturing year, manufacturing batch, hardware version, firmware version, etc.), testing device installation dates, service contract information (e.g., a contract number, contract terms, service level agreement information, etc.), testing device purchase information (e.g., an order number), calibration information (e.g., last calibration date, calibration due date, calibration status, etc.), a download status, and/or an acceptance date of testing device terms and conditions. Any of the information stored at the queueing system 312 may be updated periodically, aperiodically, on demand, in response to events such as an operator logging onto the testing device 100, and/or at any other time.

The example servicing system 302 coordinates service by the service personnel 308a, 308b to the testing devices 100, 314 based on requests received via the queueing system 312. For example, when the servicing system 302 receives a request for a technical support service from the queueing system 312, the servicing system 302 may automatically handle certain types of technical support requests and/or select one or more of the available personnel 308a, 308b to service the technical support request from the testing device 100, 314.

To service requests, the example service terminals 310a, 310b may access information provided by the queueing system 312 about the testing device 100 from which the technical service request originated. When the service personnel 308a, 308b contact an operator of the testing device 100 to attempt to resolve any issues, the service personnel 308a, 308b may have the applicable information about the testing device 100 immediately available via the service terminal 310a, 310b, which receives the applicable information (or access to the applicable information) from the servicing system 302 based on the handling of the request.

In some examples, the queueing system 312 is omitted and/or integrated into the servicing system 302. The queueing system 312 and the servicing system 302 may be implemented using any number of computing devices.

Figure 4:
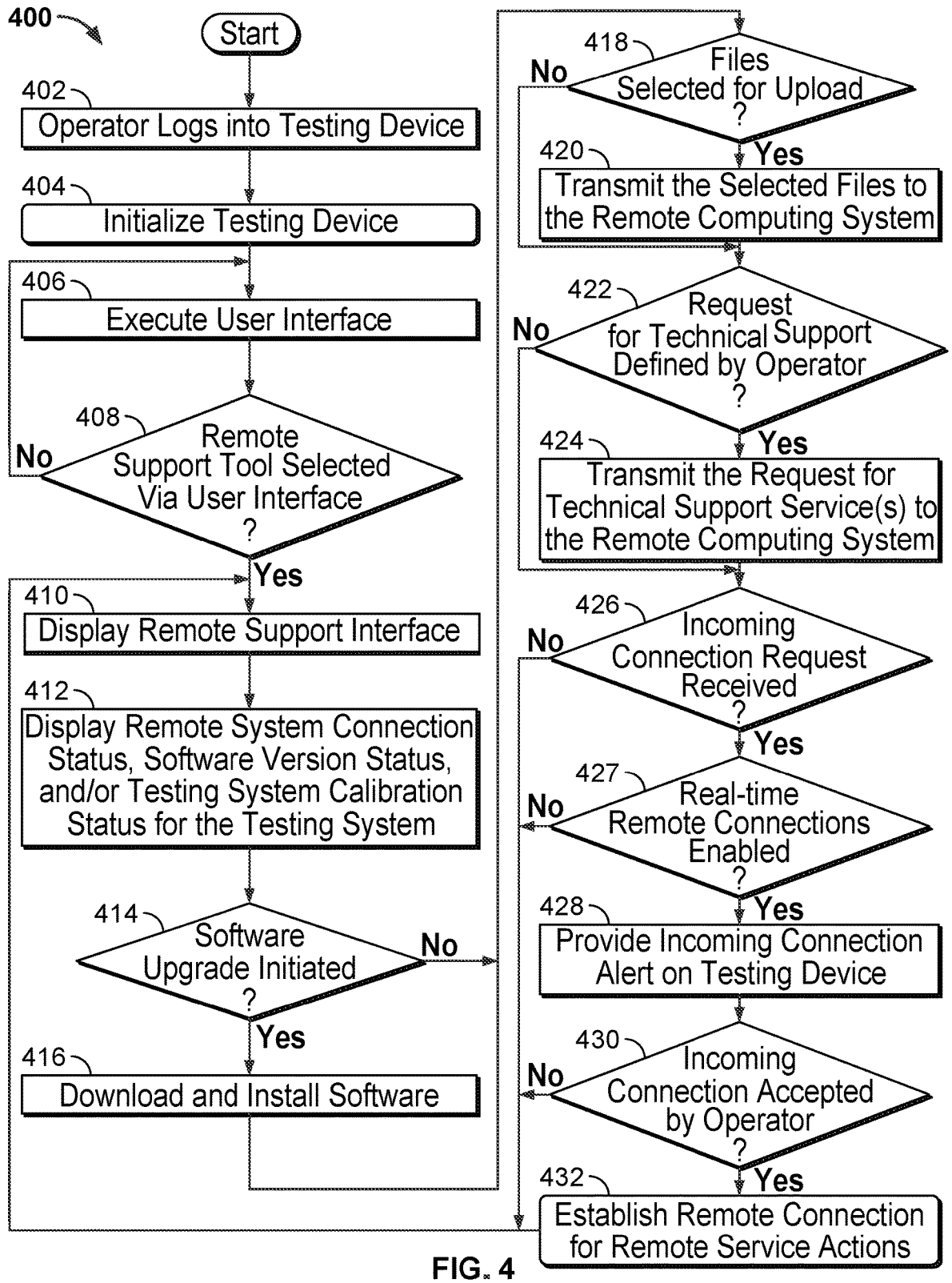
FIG. 4 is a flowchart representative of example machine readable instructions which may be executed by the example testing device of FIGS. 1 and 2 to request remote service actions.

FIG. 4 is a flowchart representative of example machine readable instructions 400 which may be executed by the example testing device 100 of FIGS. 1 and 2 to request remote service actions. The example instructions 400 may be performed by the example computing device 104 described in FIG. 2. The instructions 400 are described below with reference to the implementation of FIG. 2, but may be performed by other testing devices.

At block 402, an operator logs into the testing device 100. For example, the operator may use one or more of the I/O devices 220 (e.g., a keyboard, a touchscreen, a key card, a biometric scanner, etc.) to log into software executing on the processor 202. At block 404, the processor 202 initializes the testing device 100. For example, the processor 202 may execute a login script or other set of instructions to prepare the test fixture 102 for mechanical testing. Example instructions to implement block 404 are disclosed below with reference to FIG. 5.

At block 406, the example processor 202 executes a user interface (e.g., via the display device 224 and/or other I/O devices 220). An example user interface enables a user to set up and execute a mechanical property test according to desired parameters, to manage data generated by the testing device (e.g., storing, viewing, transferring), and/or to configure the testing device 100. At block 408, the processor 202 determines whether a remote support tool has been selected via the user interface. For example, the user interface may include an option to select a remote support tool from which an operator may submit requests for technical support services, as disclosed herein. If the remote support tool has not been selected (block 408), control returns to block 406 to continue executing the user interface and/or, if another operational mode has been selected, enters another operational mode. In some examples, the remote support tool can be selected from multiple (e.g., all) operational modes of the user interface.

If the remote support tool has been selected (block 408), at block 410 the processor displays the remote support interface. At block 412, the processor 202 displays a remote system connection status, a software version status, and/or a testing system calibration status for the testing device 100. For example, the remote system connection status may indicate whether the testing device 100 has established a communication connection with the queueing system 312 and/or the servicing system 302. The software version status may indicate the current version of software (e.g., testing software or firmware) installed on the testing device 100 and/or whether a newer version is available to be installed. The testing system calibration status may indicate a due date for calibration, and whether the testing device 100 currently requires calibration to reliably achieve a desired accuracy level.

At block 414, the processor 202 determines whether a software upgrade has been initiated. For example, when a software update is available, the example testing device 100 may enable initiation of a software upgrade. Alternatively, the software upgrade may be initiated in response to a software upgrade command received via the user interface of the testing device 100. In some examples, the initiation of a software upgrade is dependent on the operator having or obtaining predetermined credentials or approval. An example of the user interface providing an upload interface is illustrated in FIG. 7. If a software upgrade has been initiated (e.g., via a I/O device 220), at block 416 the example processor 202 downloads and installs the available software. In some examples, installation of the software requires authorization, customization, and/or other interaction with an operator via user interface(s) of the testing device 100.

In some examples, installation of the updated software requires closing the running version of the software, after which an installer can proceed to update or replace the installed software with the updated software. Before and/or after installing the available software, the computing device 104 may require a restart to begin executing the new software version. In such examples, after installing the software at block 416, control may return to block 402. In some other examples in which the software upgrade does not require a restart (e.g., the software upgrade does not affect execution of the user interface), the processor 202 may continue executing the user interface.

Figure 8:
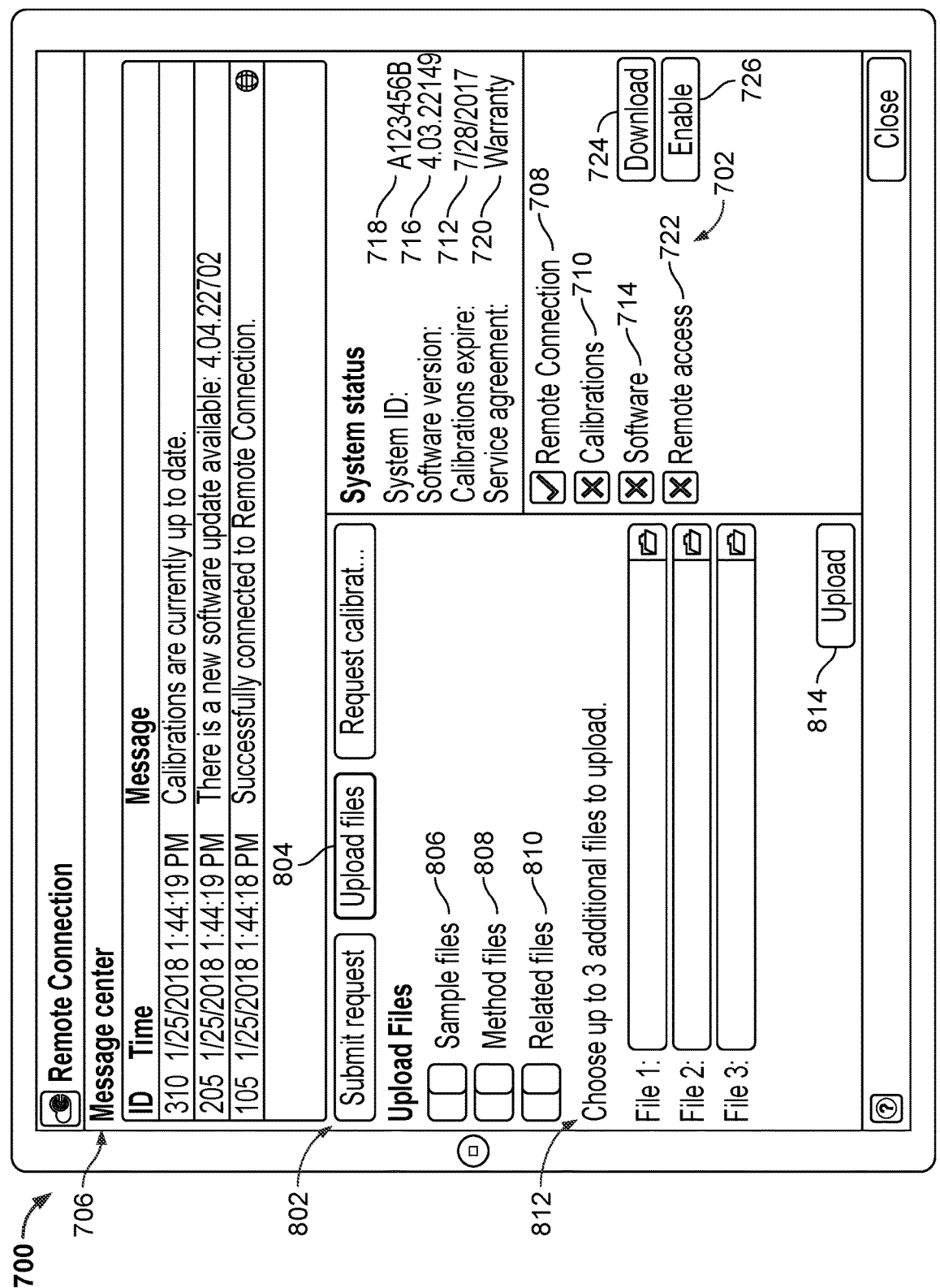
FIG. 8 illustrates an example remote service user interface that may be displayed at the testing device of FIGS. 1 and 2 and which enables a user to transmit files from the testing device to a remote computing system.

After installing the software (block 416), or if a software upgrade is not initiated (block 414), at block 418 the processor 202 determines whether files have been selected for upload. For example, the user interface may enable a user to easily transmit one or more files to the queueing system 312 and/or the servicing system 302. For example, the user interface may enable a user to easily select a file that is currently being viewed or otherwise operated on by the operator, access the file system of the computing device to select stored files, prepare and send a screenshot of the content being shown on the display 224, and/or any other files. An example of the user interface providing an upload interface is illustrated in FIG. 8. If files have been selected for upload (block 418), at block 420 the processor 202 transmits any selected files to the remote computing system.

After transmitting the files (block 420), or if files have not been selected for upload (block 418), at block 422 the processor 202 determines whether a request for technical support has been defined by the operator (or other user). For example, the user interface (e.g., as illustrated in FIG. 7) may enable a user to enter contact information and a description of requested service for submission to the remote computing system via an established connection. If a request for technical support has been defined by the operator (block 422), at block 424 the processor 202 transmits (e.g., via the network interface 214) the request for the technical support service(s) to the remote computing system.

After transmitting the request for the technical support service(s) (block 424), or if no requests have been defined by the operator (block 422), at block 426 the processor 202 determines whether an incoming connection request has been received. For example, if service personnel 308a, 308b initiate a connection with the testing device 100 via the support terminals 310a, 310b, the servicing system 302 and/or the queueing system 312 transmit a connection request to the testing device 100. The request connection may be a push-type message, a long poll response-type message (e.g., to reduce or eliminate the need to make firewall exceptions for the testing device 100 in a network), and/or any other message or protocol to transmit the connection request to the testing device 100. In some examples, the processor 202 implements a voice over IP (VOIP) client and/or an application sharing protocol client to handle incoming connection requests and/or audio, video, and/or application sharing connections.

Figure 11:
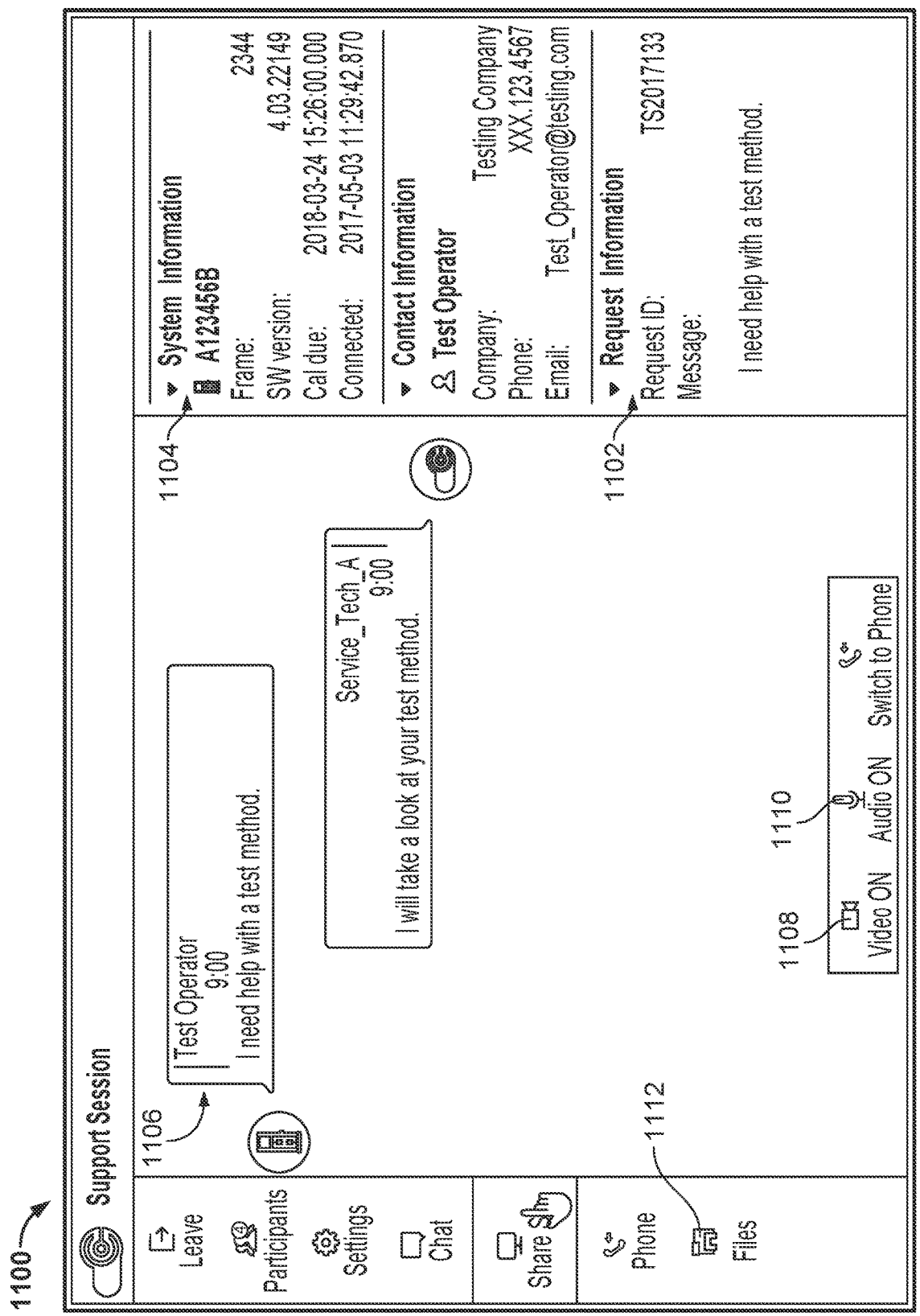
FIG. 11 illustrates an example remote service user interface that may be displayed at a computing device associated with a remote computing system.

If an incoming connection request has been received (block 426), at block 427 the processor 202 determines whether real-time connections are enabled at the testing device 100. For example, the operator (or administrator) may disable real-time connections (e.g., audio calls, audio-visual conferencing, and/or application sharing) to prevent establishing real-time connections at the testing device 100. If real-time connections are enabled (block 427), at block 428 the processor 202 provides an incoming connection alert on the testing device 100. For example, the processor 202 may output a visual alert on the user interface, as illustrated in FIG. 11.

At block 430, the processor 202 determines whether the incoming connection has been accepted by the operator. For example, the processor 202 may determine whether any inputs have been received and, if so, whether the inputs correspond to acceptance of the incoming connection. If the incoming connection has been accepted by the operator (block 430), at block 432 the processor 202 establishes the remote connection for performing remote service actions. The remote connection may involve, for example, an audio connection enabling the operator to speak with the calling service personnel 308a, 308b, an application sharing or screen sharing application enabling the service personnel 308a, 308b to view and/or control the testing device 100 via the computing device 104. Example instructions for establishing the remote connection are described below with reference to FIG. 6.

After the remote connection has ended (block 432), if the incoming connection is not accepted (block 430), if real-time remote connections are disabled at the testing device 100 (block 427), or if the no incoming connection requests have been received (block 426), control returns to block 410 to continue displaying the remote support interface.

While the example instructions 400 include an example order of execution of the blocks 402-430, other arrangements of some or all the blocks 402-430 may be used. Additionally or alternatively, one or more blocks may be added, omitted, and/or modified.

Figure 5:
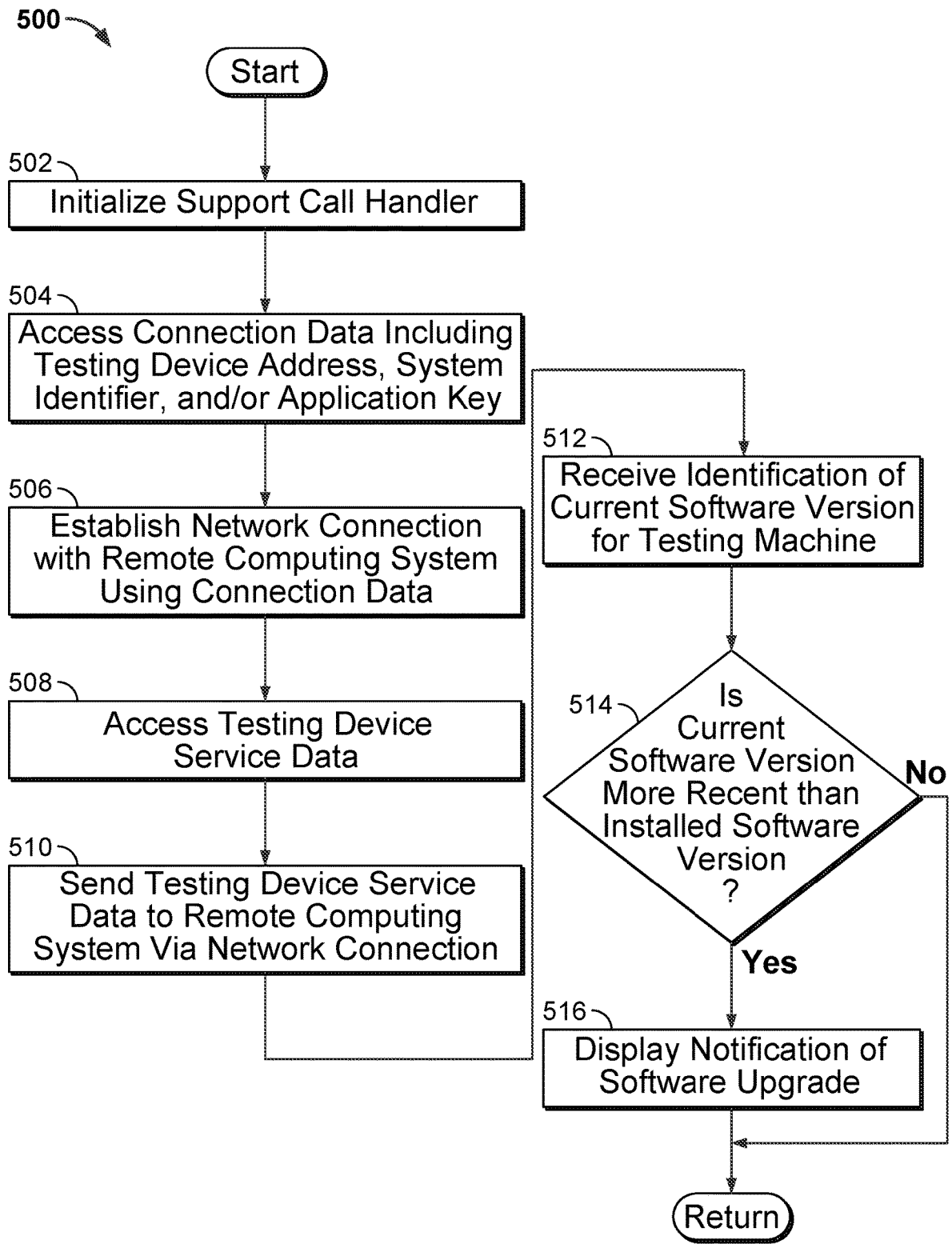
FIG. 5 is a flowchart representative of example machine readable instructions which may be executed by the example testing device of FIGS. 1 and 2 to initialize the testing device.

FIG. 5 is a flowchart representative of example machine readable instructions 500 which may be executed by the example testing device of FIGS. 1 and 2 to initialize the testing device. The example instructions 500 of FIG. 5 may be executed by the processor 202 of FIG. 2 to implement block 404 of FIG. 4 to initialize the testing device 100. The instructions 500 may enter from block 402, when an operator logs into the testing device 100.

At block 502, the processor 202 initializes a support call handler. The support call handler may be a VoIP application or other remote connection handler that receives the incoming connection requests from the servicing system 302 and/or the queueing system 312 and/or manages the connection when established. At block 504, the processor 202 accesses connection data that may be used by the queueing system 312 and/or the servicing system 302 to establish and/or maintain a connection with the testing device 100. For example, the connection data may include a testing device address (e.g., an IP address, a media access control (MAC) identifier, etc.), a system identifier (e.g., a serial number of the testing device 100), and/or an application key. The processor 202 may access the connection data from the mass storage device 210, the RAM 206, the ROM 208, the controller 238, and/or any other location in which the connection data may be stored.

At block 506, the processor 202 (e.g., via the network interface 214) establishes a network connection with the remote computing system using the connection data. For example, the processor 202 may request a connection from the queueing system 312 and/or the servicing system 302 via the network 306. The request may include any or all of the connection data accessed by the processor 202, and/or may involve a handshake protocol or any other process of establishing the connection. In some examples, the connection data results in the generation of a session identifier or other connection identifier that can be used to identify the testing device 100 to the remote computing system for the duration of the connection (or until the session/connection identifier is replaced).

At block 508 (e.g., when the connection is established between the testing device 100 and the queueing system 312 and/or the servicing system 302), the processor 202 accesses service data for the testing device 100. The processor 202 may access the service data from the mass storage device 210, the RAM 206, the ROM 208, the controller 238, and/or any other location in which the connection data may be stored. Example service data may include contact information of personnel associated with the testing devices 100, 314, physical location information for the testing devices 100, 314, testing device diagnostic information, testing device software information, current software version information, service and support history for the testing devices 100, 314, testing device model information (e.g., model numbers, manufacturing year, manufacturing batch, hardware version, firmware version, etc.), testing device installation dates, service contract information (e.g., a contract number, contract terms, service level agreement information, etc.), testing device purchase information (e.g., an order number), calibration information (e.g., last calibration date, calibration due date, calibration status, etc.), a download status, and/or an acceptance date of testing device terms and conditions.

At block 510, the processor 202 sends the service data to the remote computing system (e.g., the queueing system 312 and/or the servicing system 302) via the network connection.

At block 512, the processor 202 receives an identification of the current software version available for the testing device 100. The processor 202 compares the available software version to the version installed on the testing device 100. If the current software version is more recent than the installed software version (block 514), at block 516 the processor 202 displays a notification of an available software upgrade. An example of a displayed notification is illustrated in FIG. 7.

After displaying the notification (block 516), or if the current software version is not more recent than the installed software version (block 514), the example instructions 500 may end and transfer control to block 406 of FIG. 4.

Figure 6:
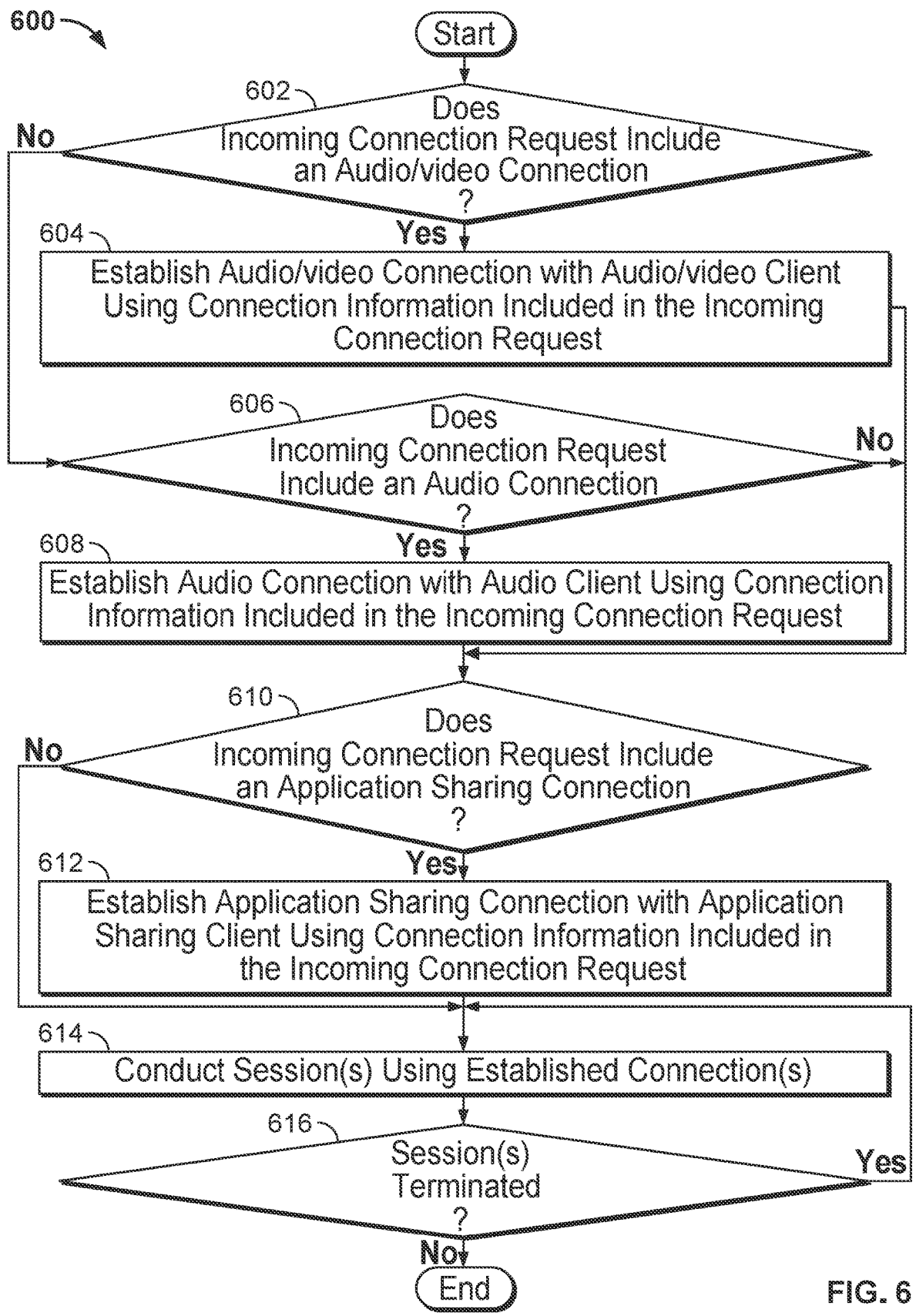
FIG. 6 is a flowchart representative of example machine readable instructions which may be executed by the example testing device of FIGS. 1 and 2 to establish a remote connection for performing remote service actions at the testing device.

FIG. 6 is a flowchart representative of example machine readable instructions 600 which may be executed by the example testing device of FIGS. 1 and 2 to establish a remote connection for performing remote service actions at the testing device 100. The example instructions 600 of FIG. 5 may be executed by the processor 202 of FIG. 2 to implement block 432 of FIG. 4 to establish a remote connection. The instructions 600 may enter from block 430, when an operator accepts an incoming connection at the testing device 100.

At block 602, the processor 202 determines whether the incoming connection request (e.g., identified in block 426 of FIG. 4) includes an audio/video connection. For example, the incoming connection request may include a request following the ITU H.323 standard and/or any other audio/video standard or protocol. If the incoming connection request includes the audio/video connection (block 602), at block 604 the example processor 202 establishes the audio/video connection with an audio/video client, using connection information including in the incoming connection request. The audio/video connection enables personnel at the testing device 100 to use a microphone, speaker, camera, and display to conduct an audiovisual conference with the one or more service personnel 308a, 308b using the terminal(s) 310a, 310b to, for example, discuss a technical support request and/or perform remote service actions (e.g., with or without the assistance of the personnel present at the If the incoming connection request includes the audio/video connection (block 602), at block 606 the processor 202 determines whether the incoming connection request includes an audio connection (e.g., an audio-only connection). For example, the incoming connection request may include a request following the ITU H.323 standard, the SIP protocol, and/or any other audio standard or protocol. If the incoming connection request includes the audio connection (block 606), at block 608 the example processor 202 establishes the audio connection with an audio client, using connection information including in the incoming connection request.

After establishing the audio connection (block 608), after establishing the audio/video connection (block 604), or if the incoming connection request does not include either of an audio connection or an audio/video connection (blocks 602 and 606), at block 610 the processor 202 determines whether the incoming connection request includes an application sharing connection. For example, the incoming connection request may include a request including a remote login request (e.g., the Remote Desktop Protocol, a Remote Frame Buffer protocol), a real-time collaboration request, and/or any other application sharing standard or protocol. If the incoming connection request includes the application sharing connection (block 610), at block 612 the example processor 202 establishes the application sharing connection with an application sharing client, using connection information including in the incoming connection request. The application sharing connection may enable exchanging of display content information between the testing device 100 and the connected terminal 310a, 310b, remote control of one of the testing device 100 and the connected terminal 310a, 310b via the other device, and/or any other application sharing tasks.

While the application sharing connection is included in the same connection request as the audio/video connection or the audio connection in the example blocks 602-612, in other examples the application sharing connection is received in separate incoming connection requests. The separate requests may be received at substantially the same time or at different times.

After establishing the application sharing connection (block 612), or if the incoming connection request (block 610), at block 614 the processor 202 conducts the established session(s). At block 616, the processor 202 determines whether the session(s) are to be terminated. For example, the session(s) may terminate in response to an input from the operator and/or in response to a termination message from the terminal 310a, 310b. If the session(s) are not to be terminated (block 616), control returns to block 614 to continue the session(s). When the session(s) are to be terminated (block 616), the example processor 202 concludes the session(s) and the example instructions 600 end.

FIG. 7 illustrates an example remote service user interface 700 that may be displayed at the testing device 100 of FIGS. 1 and 2 and which includes status information about the testing device 100. The example user interface 700 includes system status information 702, a request submission component 704, and a connection message list 706.

The example system status information 702 may include, for example, connection data (e.g., accessed at block 504 of FIG. 5) and/or service data (e.g., accessed at block 508 of FIG. 5). In the illustrated example, the system status information 702 includes a connection status 708 indicative of whether a connection is established between the testing device 100 and the remote computing system (e.g., the queueing system 312 and/or the servicing system 302) for transfer of data and/or requests. The system status information 702 further includes a calibration status 710 and a calibration due date 712, a software update status 714 and a software version number 716, a system identifier 718, a service agreement status 720, and a remote access status 722. As illustrated in FIG. 7, the example user interface 700 indicates that the testing device 100 has an established connection with the remote computing system (e.g., the connection status 708), the testing device 100 is due for calibration (e.g., the calibration status 710), a software upgrade is available for the testing device 100 (e.g., the software update status 714), and that remote access is not enabled on the testing device 100 (e.g., the remote access status 722). Based on the software update status 714, the example interface 700 displays a software update button 724 that may be selected to initiate a software download. Based on the remote access status 722, the interface 700 also displays a remote access enable button 726 that enables receipt of support call initiation messages from the servicing system 302.

The example request submission component 704 enables an operator to enter data describing a request for technical support services for the testing device 100. Example data includes a description of the requested technical support service (e.g., a request text input 728) and contact information for the operator (or other personnel associated with the testing device 100), such as first and last names, a phone number, an email address, and/or any other contact information. The request may be transmitted by selecting a request submission button 730. When the request submission button 730 is selected, the example testing device 100 (e.g., via the processor 202 and/or the network interface 214) transmits the request data to the queueing system 312 and/or to the servicing system 300.

The queueing system 312 recognizes the request data as received from the testing device 100 (e.g., based on a session ID, a connection identifier, a system identifier, etc.) and combines the request data received from the testing device 100 with other data stored at the queueing system 312 in association with the testing device 100. For example, the queueing system 312 may look up the service information most recently reported or updated by the testing device 100, associate the service information with the request data, and forward the request data to the servicing system 300 for handling by the service personnel 308a, 308b.

The connection message list 706 displays information related to requesting and/or providing technical support services to the testing device 100. For example, the processor 202 may output informational messages to the operator, such as confirmations of connection and/or disconnection with the remote computing system, information about software updates, confirmations of receipt of request messages at the remote computing system, alerts about messages transmitted from the remote computing system, calibration status alerts, and/or any other information. If connections to the remote servicing system(s) are disabled, if software updates are disabled for the testing device 100, and/or if calibration statuses are disabled, the example connection message list 706 may include message(s) indicating that, respectively, the testing device 100 is not connected to the remote servicing system, that software updates are disabled, and/or that calibration statuses are not being checked or provided. For example, any of the remote servicing connection, software updates, and/or calibration statuses may be disabled at the testing device 100 and/or determined not to be authorized at the queueing system 312 or the servicing system 302.

FIG. 8 illustrates an example remote service user interface 800 that may be displayed at the testing device 100 of FIGS. 1 and 2 and which enables a user to transmit files from the testing device 100 to a remote computing system. The example user interface 800 includes a file upload dialog 802, which may be displayed in response to selection of a file upload button 804 in the interface 700 of FIG. 7. The example file upload dialog 802 replaces the request submission component 704 in the interface 800, while the system status information 702 and the connection message list 706 remain.

The file upload dialog 802 enables a user to upload files that are currently being used on the testing device 100 (e.g., test result files) and/or other files determined by the processor 202 to be related to a request for technical support services. For example, the file upload dialog 802 may include selections for sample files 806 (e.g., files indicating data and/or test results from a mechanical property test), method files 808 (e.g., parameters and/or other information used to run a mechanical property test), and/or related files (e.g., files currently in use). The selections 806, 808, 810 enable the operator to easily upload, for example, test data and/or method files that are currently or recently used, without being required to browse the file system to locate the data and/or files (which may not even be known to the operator).

The file upload dialog 802 further enables an operator to navigate the file system using a file selection dialog 812 to select one or more stored files for upload. When files have been selected for upload, the operator may select a file upload button 814 to cause the processor 202 to access and transmit the selected files to the remote computing system (e.g., the queueing system 312 and/or the servicing system 302). In some examples, the files are transmitted with an identifier of the testing device 100 (e.g., based on a session ID, a connection identifier, a system identifier, etc.).

The queueing system 312 recognizes the files as received from the testing device 100 (e.g., based on a session ID, a connection identifier, a system identifier, etc.) and combines the request data received from the testing device 100 with other data stored at the queuing system 312 in association with the testing device 100. For example, the queueing system 312 may look up the service information most recently reported or updated by the testing device 100, associate the service information with the request data, and forward the request data to the servicing system 300 for handling by the service personnel 308a, 308b.

Figure 9:
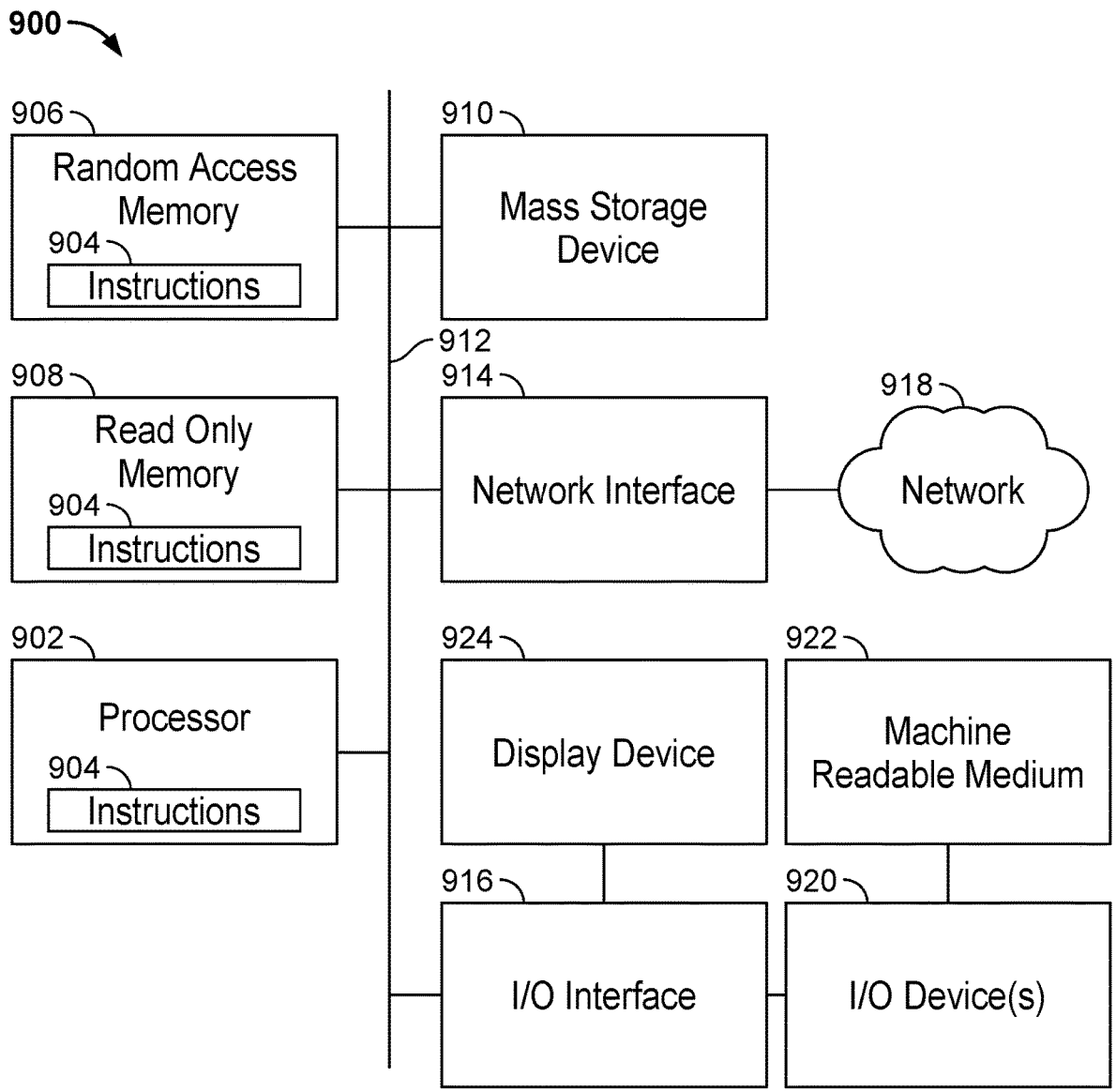
FIG. 9 is a block diagram representative of computing system that may be used to implement the example queuing system and/or the example servicing system of FIG. 3.

FIG. 9 is a block diagram representative of a computing system 900 that may be used to implement the example queuing system 312, the example servicing system 302, and/or the example service terminal(s) 310a, 310b of FIG. 3. The example computing system 900 may be a general-purpose computer, a server, a laptop computer, a tablet computer, a mobile device, a server, an all-in-one computer, and/or any other type of computing device.

The example computing system 900 of FIG. 9 includes a processor 902. The example processor 902 may be any general purpose central processing unit (CPU) from any manufacturer. In some other examples, the processor 902 may include one or more specialized processing units, such as RISC processors with an ARM core, graphic processing units, digital signal processors, and/or system-on-chips (SoC). The processor 902 executes machine readable instructions 904 that may be stored locally at the processor (e.g., in an included cache or SoC), in a random access memory 906 (or other volatile memory), in a read only memory 908 (or other non-volatile memory such as FLASH memory), and/or in a mass storage device 910. The example mass storage device 910 may be a hard drive, a solid state storage drive, a hybrid drive, a RAID array, and/or any other mass data storage device.

A bus 912 enables communications between the processor 902, the RAM 906, the ROM 908, the mass storage device 910, a network interface 914, and/or an input/output interface 916.

The example network interface 914 includes hardware, firmware, and/or software to connect the computing system 900 to a communications network 918 such as the Internet. For example, the network interface 914 may include IEEE 802.X-compliant wireless and/or wired communications hardware for transmitting and/or receiving communications.

The example I/O interface 916 of FIG. 9 includes hardware, firmware, and/or software to connect one or more input/output devices 920 to the processor 902 for providing input to the processor 902 and/or providing output from the processor 902. For example, the I/O interface 916 may include a graphics processing unit for interfacing with a display device, a universal serial bus port for interfacing with one or more USB-compliant devices, a Fire Wire, a field bus, and/or any other type of interface. The example queuing system 312 and/or the example servicing system 302 includes a display device 924 (e.g., an LCD screen) coupled to the I/O interface 916. Other example I/O device(s) 920 may include a keyboard, a keypad, a mouse, a trackball, a pointing device, a microphone, an audio speaker, a display device, an optical media drive, a multi-touch touch screen, a gesture recognition interface, a magnetic media drive, and/or any other type of input and/or output device.

The example computing system 900 may access a non-transitory machine readable medium 922 via the I/O interface 916 and/or the I/O device(s) 920. Examples of the machine readable medium 922 of FIG. 9 include optical discs (e.g., compact discs (CDs), digital versatile/video discs (DVDs), Blu-ray discs, etc.), magnetic media (e.g., floppy disks), portable storage media (e.g., portable flash drives, secure digital (SD) cards, etc.), and/or any other type of removable and/or installed machine readable media.

Figure 10:
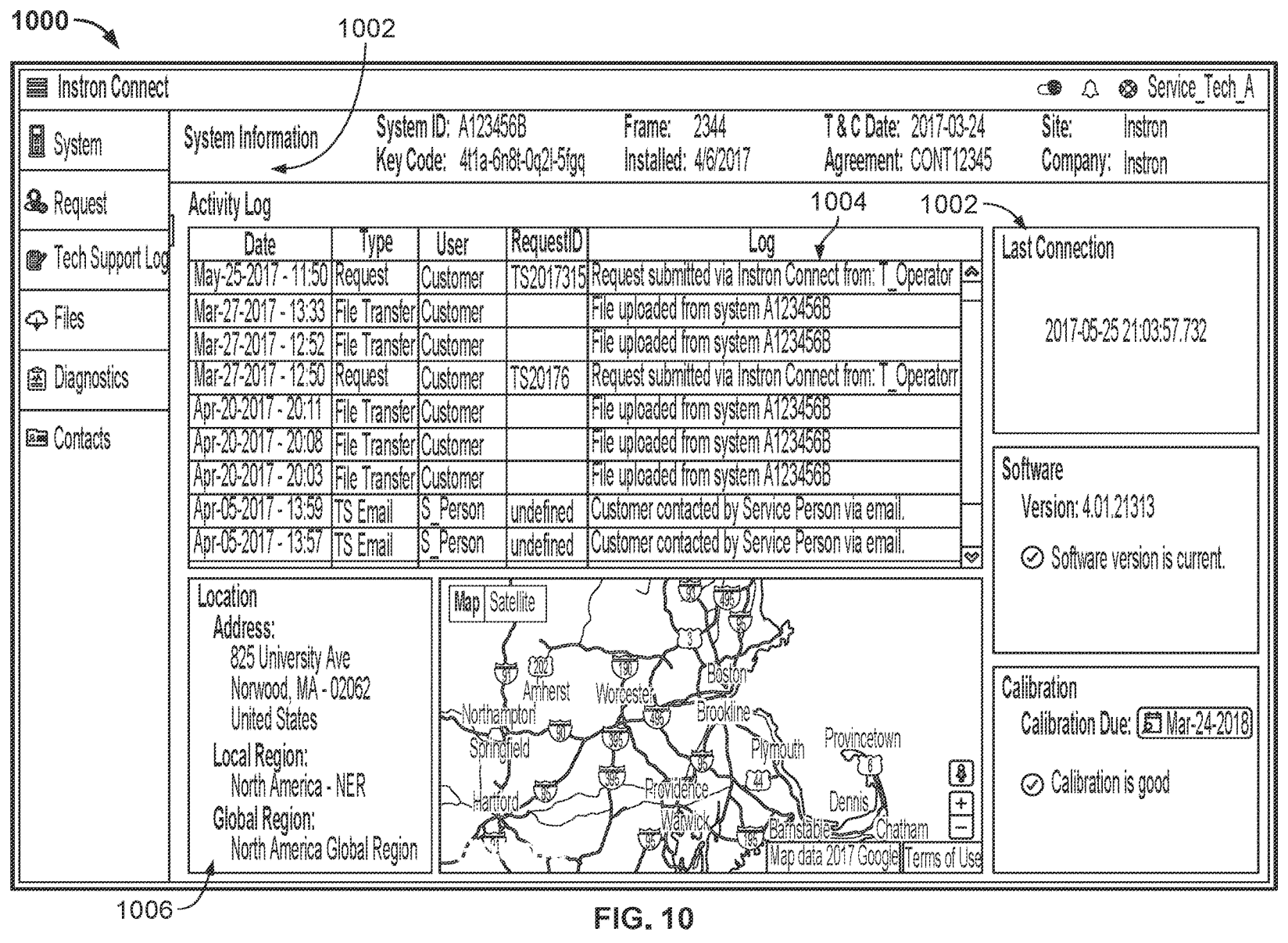

FIG. 10 illustrates an example remote service user interface 1000 that may be displayed at a computing device (e.g., the computing system 900 of FIG. 9) associated with a remote computing system (e.g., the queueing system 312 and/or the servicing system 302 of FIG. 3). The example interface 1000 enables a service operator to view information associated with the testing device 100 from which a service request is been received at the computing device.

The remote service user interface 1000 enables the service personnel 308a, 308b to readily view system data (e.g., system status information, operator contact information, etc.) via a system information component 1002. In some examples, the system information component 1002 may be replaced with a connection information component to display the connection data and/or a service data component to display the service data transmitted by the testing device 100 and/or stored by the queueing system 312. In some examples, the system data, the connection data, and/or the service data may be provided in the same interface 1002. The illustrated system information component 1002 includes system data, connection data, and/or service data such as a system identifier, a security key code, a test fixture identifier and/or model number, a testing device installation date, a terms and conditions agreement date, an agreement identifier, a location identifier, a customer identifier, a timestamp of the most recent connection to the testing device 100, an installed software version of the testing device 100, a calibration status of the testing device 100, and/or any other system data, connection data, service data, and/or other status information.

The example interface 1000 further includes an activity log 1004 that lists events and timestamps associated with remote service performed on the testing device 100, and timestamps of such remote service actions. For example, the activity log 1004 may include remote service actions such as receiving requests from the testing device 100, calibration scheduling and/or performance, software updates, real-time connections with the testing device 100 (e.g., audio, video, text chat, application sharing, etc.), and/or non-real-time communications with the testing device 100 and/or personnel associated with the testing device (e.g., emails).

The interface 1000 further includes location information for the testing device 100 (e.g., a physical address, a map) and/or available service assets for the testing device 100. While not shown in the interface 1000, the example interface 1000 may enable the service personnel 308a, 308b to select other interfaces (e.g., software menu options) to view other information associated with the testing device 100, such as technical service requests, viewing files uploaded by the testing device 100 or otherwise provided to the servicing system 302, viewing diagnostic information for the testing device 100, and/or any other service information and/or activities.

FIG. 11 illustrates an example remote service user interface 1100 that may be displayed at a computing device (e.g., the computing system 900 of FIG. 9) associated with a remote computing system (e.g., the queueing system 312 and/or the servicing system 302 of FIG. 3). Like the interface 1000 of FIG. 10, the interface 1100 enables a service operator to view information associated with the testing device 100 from which a service request is been received at the computing device. The interface 1100 may be selected by the service personnel 308a, 308b to enable communication (e.g., audio, video, text, remote control, etc.) with an operator at the testing device 100.

The example remote service user interface 1100 enables service personnel 308a, 308b to readily view the request data transmitted from the testing device 100 via a request information component 1102. The request information component 1102 includes a request identifier (e.g., assigned by the testing device 100, the queueing system 312, the servicing system 302, etc.). The remote service user interface 1100 also enables the service personnel 308a, 308b to readily view system data (e.g., system status information, operator contact information, etc.) via a system information component 1104. In some examples, the system information component 1104 may be replaced with a connection information component to display the connection data and/or a service data component to display the service data transmitted by the testing device 100 and/or stored by the queueing system 312. In some examples, the system data, the connection data, and/or the service data may be provided in the same interface 1100.

The example user interface 1100 of FIG. 11 includes a communication dialog 1106, through which the service personnel 308a, 308b may communicate with the operator via the testing device 100 via real-time and/or non-real-time communication methods. For example, the service personnel 308a, 308b may communicate via text-based methods such email and/or messaging, and/or may initiate a live support connection such as an audio connection, a video connection, and/or an application sharing connection with the testing device 100 using one or more live connection buttons 1108, 1110.

In response to selecting the live connection button(s) 1108, 1110, the example service terminal(s) 308a, 308b initiates a connection with the testing device 100, including sending a support call initiation message. Example support call initiation messages may use session initiation protocol (SIP), secure real-time transfer protocol (SRTP), and/or any other protocol for establishing the remote connection between the terminal 310a, 310b and the testing device 100.

The example user interface 1100 may further enable service personnel 308a, 308b to view files uploaded via the testing device 110 (e.g., as illustrated in FIG. 8). For example, the service personnel 308a, 308b may select a file viewing component 1112 to select and/or view files that have been received in association with the testing device 100 with which the service terminal 310a, 310b is currently communicating or otherwise servicing. In some examples, files uploaded by the testing device 100 are forwarded to the service terminal 310a, 310b by the queueing system 312, after association by the queueing system 312 of the files with one or more identifiers and/or other relevant information about the testing device 100.

Figure 12:
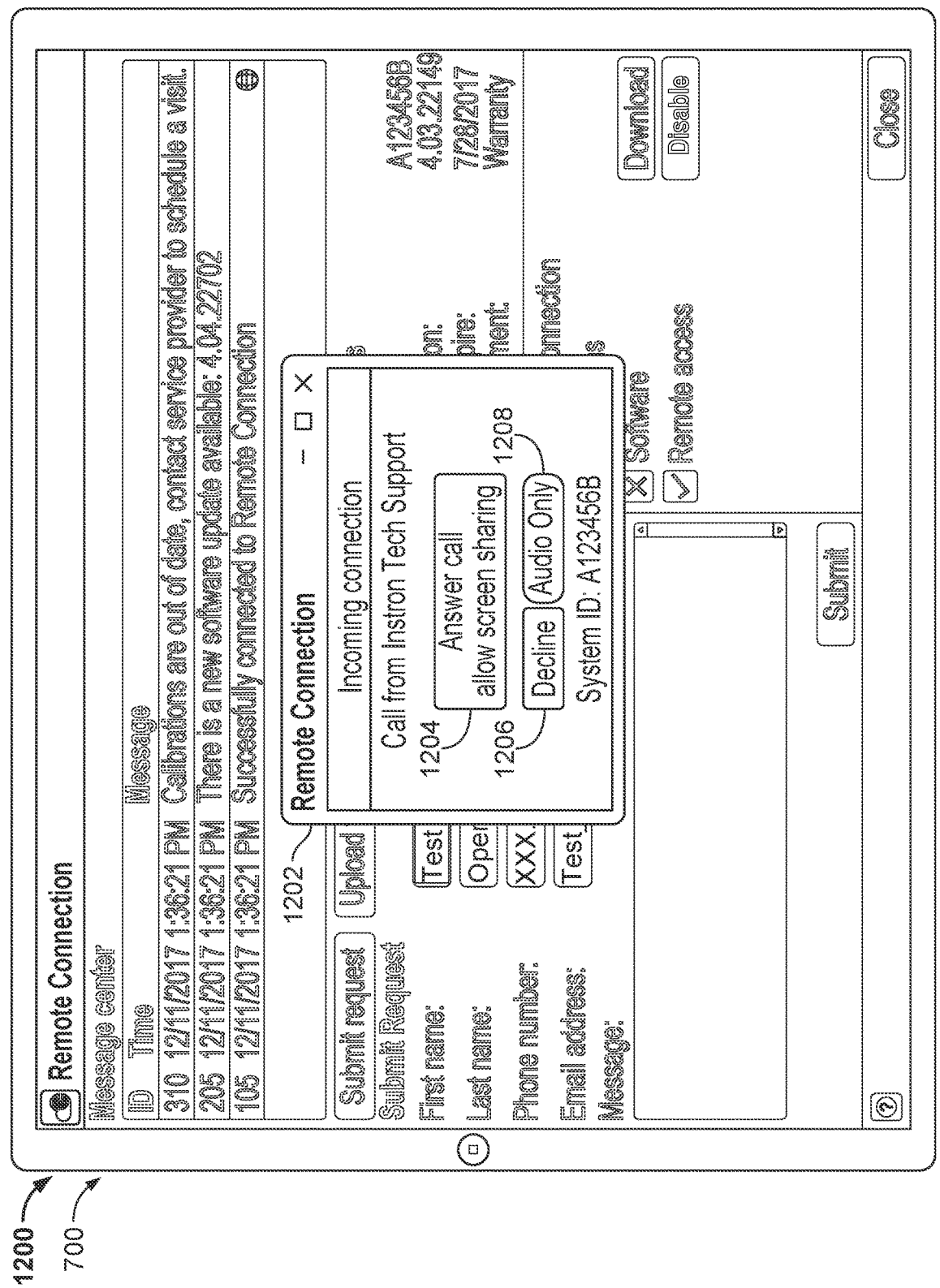
FIG. 12 illustrates an example user interface that may be displayed at the testing device of FIGS. 1 and 2, including an inbound call alert.

FIG. 12 illustrates an example user interface 1200 that may be displayed at the testing device 100 of FIGS. 1 and 2. The example user interface 1200 may include the user interface 700 of FIG. 7, over which an inbound call alert 1202 is displayed in response to receiving a support call initiation message at the testing device 100. The example inbound call alert 1202 includes a connection acceptance button 1204, a connection decline button 1206, and an indication 1208 of the remote connection request (e.g., audio, video, application sharing, etc.). The operator may select the connection acceptance button 1204 to authorize the call, or select the connection decline button 1206.

If the operator selects the connection acceptance button 1204, the example testing device 100 establishes the connection with the service terminal 310a, 310b.

Figure 13:
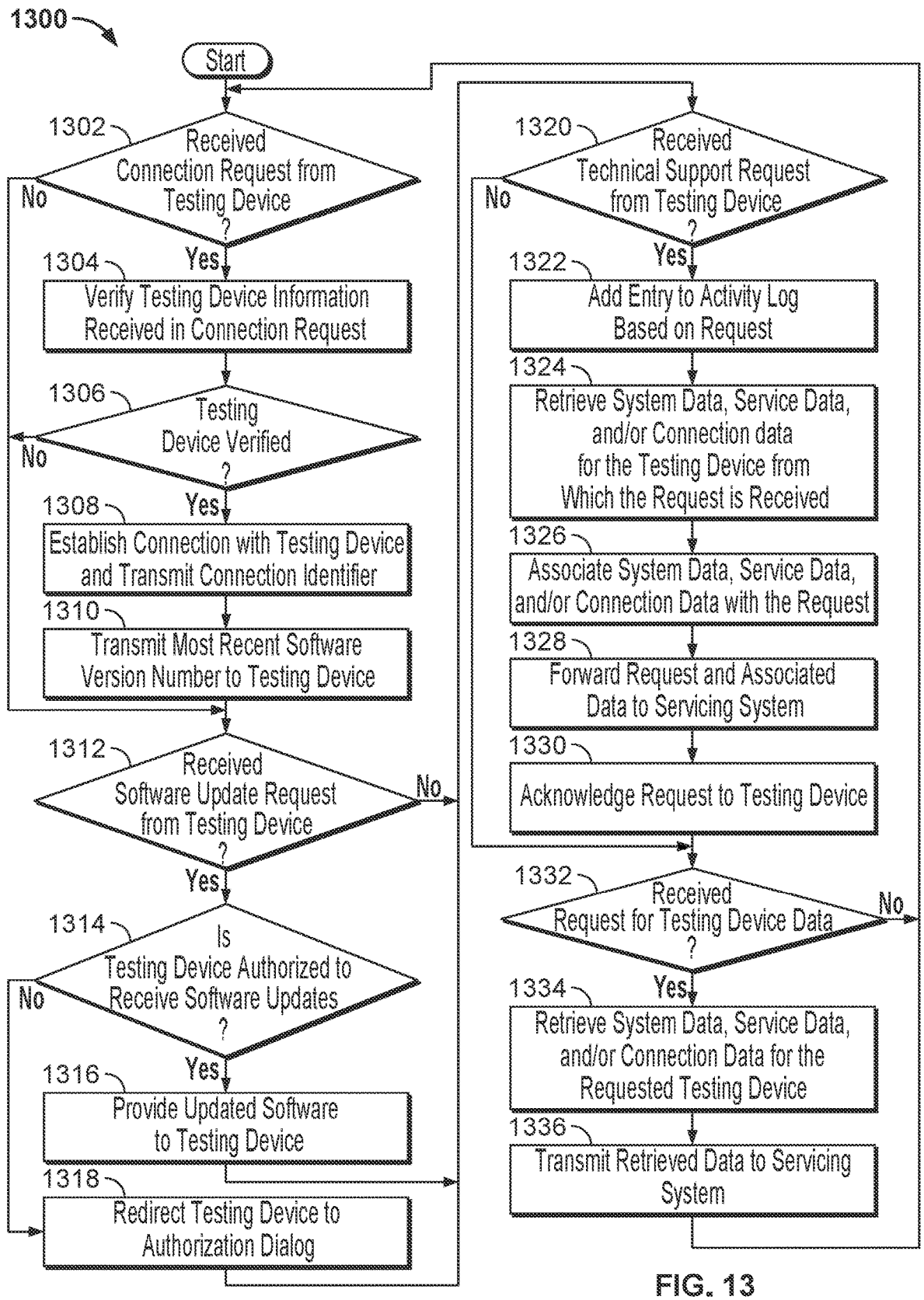
FIG. 13 is a flowchart representative of example machine readable instructions which may be executed by the example queueing system and/or the servicing system of FIG. 3 to process requests.

FIG. 13 is a flowchart representative of example machine readable instructions 1300 which may be executed by the example queueing system 312 and/or the servicing system 302 of FIG. 3 to process requests. The example instructions 1300 may be performed by the processor 902 of FIG. 9 to implement, for example, the queueing system 312 to receive and handle connection requests, software update requests, and/or technical support requests from the testing device 100, and/or requests for testing device data from the servicing system 302 and/or the support terminals 310a, 310b.

At block 1302, the processor 902 determines whether a connection request has been received from a testing device (e.g., the testing devices 100, 314 of FIG. 3). For example, the processor 902 may select a request for processing from a queue of requests received at the queueing system 312. If a connection request has been received (block 1302), at block 1304 the processor 902 verifies the testing device information received in the connection request. For example, the processor 902 may determine whether the information received in the request (e.g., a serial number, operator information, etc.) corresponds to information stored in associated with the testing device 100 (e.g., whether the testing device 100 is subscribed to a remote connection service).

At block 1306, the processor 902 determines whether the testing device 100 has been verified. If the testing device 100 has been verified (block 1306), at block 1308 the processor 902 establishes a connection with the testing device 100 (e.g., via the network interface 914) and transmits a connection identifier to the testing device 100. The processor 902 may also store the connection identifier in association with the testing device 100 for reference with future requests from the testing device 100. At block 1310, the processor 902 transmits a most recent software version number to the testing device 100. Transmitting the software version number may involve determining a current software version corresponding to the testing device 100 based on, for example, the serial number and/or model number of the testing device 100. In this manner, the example queueing system 312 may inform the testing device 100 of the current software version each time a connection is established.

After transmitting the software version number (block 1310), or if a connection request has not been received (block 1302), at block 1312 the processor 902 determines whether a software update request has been received. For example, a message stored in the message queue at the queueing system 312 may be a software update request. If a software update request has been received (e.g., from the testing device 100) (block 1312), at block 1314 the example processor 902 determines whether the testing device 100 is authorized to receive software updates. For example, the processor 902 may access a database to determine whether the testing device 100 is subscribed to receive software updates and/or whether any software updates are available to the testing device 100 (e.g., under a software rollout policy).

If the testing device 100 is authorized to receive software updates (block 1314), at block 1316 the processor 902 provides the updated software to the testing device 100. If the testing device 100 is not authorized to receive software updates (block 1314), at block 1318 the processor 902 redirects the testing device 100 to an authorization dialog. For example, the processor 902 may transmit a response with a URL to enable an operator of the testing device to subscribe to a software update service, indicate authorization from an administrator of the testing device 100, and/or any other authorization.

After redirection the testing device 100 (block 1318), after providing the updated software (block 1316), or if a software update request has not been received (block 1312), at block 1320 the processor 902 determines whether a technical support request has been received from a testing device. If a technical support request has been received (block 1320), at block 1322 the processor 902 adds an entry to an activity log based on the request. For example, the activity log may store information associated with support requests and/or support services provided.

At block 1324, the processor 902 retrieves system data, service data, and/or connection data for the testing device 100 from which the request is received. For example, the processor 902 may access, from a database or other storage, one or more of unique system identifiers of the testing device 100, session identifiers or other connection information associated with the testing device 100, contact information of personnel associated with the testing device 100, physical location information for the testing device 100, testing device software information, current software version information, service and support history for the testing device 100, testing device model information (e.g., model numbers, manufacturing year, manufacturing batch, hardware version, firmware version, etc.), testing device installation dates, service contract information (e.g., a contract number, contract terms, service level agreement information, etc.), testing device purchase information (e.g., an order number), calibration information (e.g., last calibration date, calibration due date, calibration status, etc.), a download status, and/or an acceptance date of testing device terms and conditions. At block 1326, the processor 902 associates the system data, the service data, and/or the connection data with the request.

At block 1328, the queueing system 312 (e.g., via the processor 902) forwards the request and any associated data to the servicing system 302. The example servicing system 302 may assign the request to appropriate service personnel 308a, 308b, who may then access the request and/or any associated data, and/or request further information from the queuing system 312 via the terminal(s) 310a, 310b. At block 1330, the processor 902 acknowledges the technical support request to the testing device 100.

After acknowledging the technical support request (block 1330), or if a technical support request has not been received (block 1320), at block 1332 the processor 902 determines whether a request for testing device data has been received. For example, the queueing system 312 may receive requests for data associated with a technical support request being handled at the terminals 310a, 310b. If a request for testing device data has been received (block 1332), at block 1334 the processor 902 retrieves system data, service data, and//or connection data for the requested testing device. At block 1336, the processor 902 transmits the retrieved data to the servicing system 302 (or to the requesting terminal 310a, 310b).

After transmitting the retrieved data to the servicing system 302, or if a request for testing device data has not been received (block 1332), control returns to block 1302 to continue processing messages.

Figure 14:
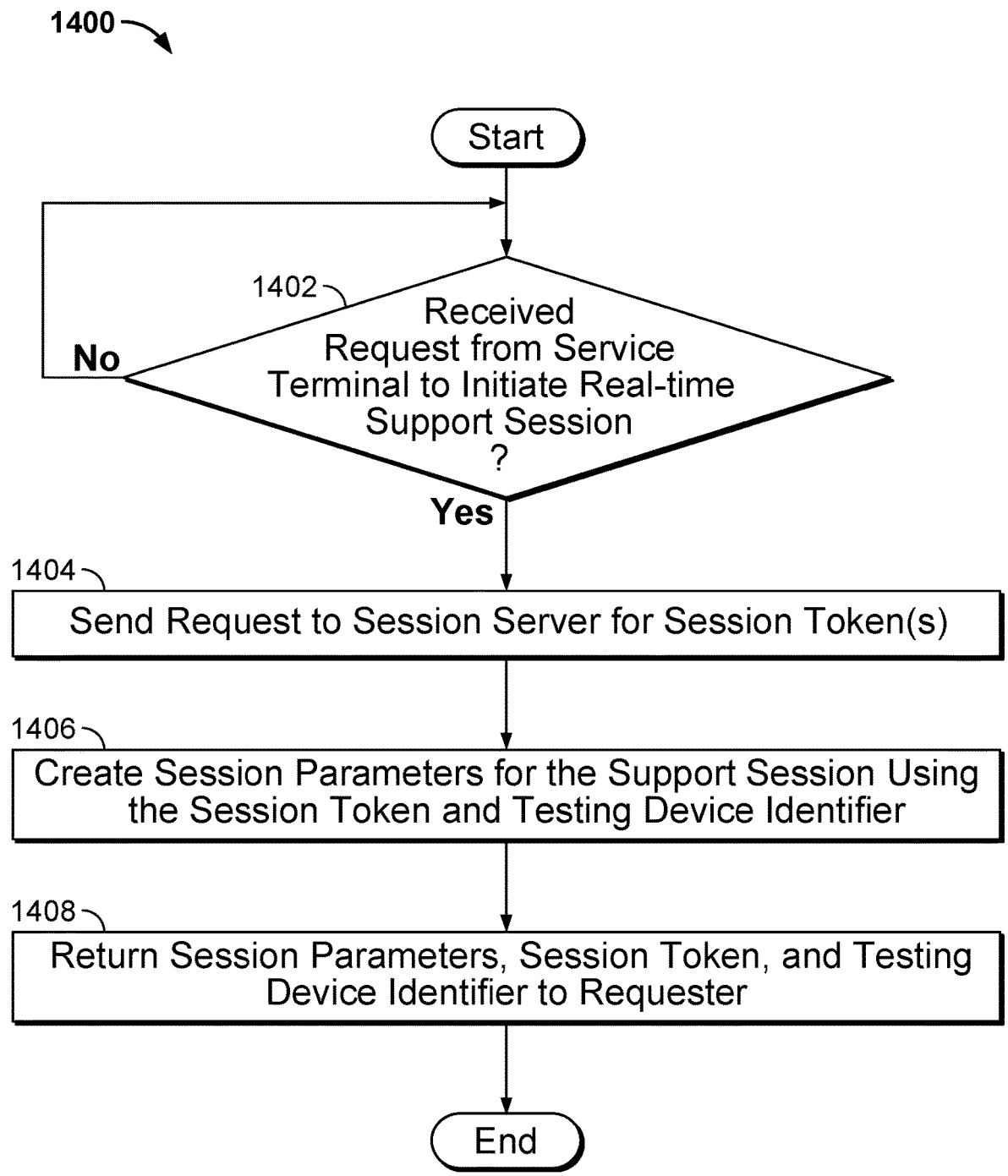
FIG. 14 is a flowchart representative of example machine readable instructions which may be executed by the example queueing system and/or the servicing system to perform remote service action(s) at the testing device of FIGS. 1, 2, and 3.

FIG. 14 is a flowchart representative of example machine readable instructions 1400 which may be executed by the example queueing system 312 and/or the servicing system 302 to perform establish a real-time support session at the testing device 100 of FIGS. 1, 2, and 3. The example instructions 1400 may be performed by the processor 902 of FIG. 9 to implement the queueing system 312 to establish a real-time support session between a terminal 310a, 310b in the servicing system 302 and a testing device 100 with an established connection to the queueing system 312. In some examples, the instructions 1400 may be performed by a separate server within the queueing system 312 from a server performing the instructions 1300 of FIG. 13, or may be performed in a parallel process.

At block 1402, the example processor 902 determines whether a request has been received from a service terminal 310a, 310b to initiate a real-time support session. Example real-time support sessions that may be requested include one or more of an audio/video or audio-only session, and/or an application sharing session. If a request has not been received (block 1402), control may iterate to block 1402 to await a request to initiate a real-time support session.

When a request has been received from a service terminal 310a, 310b to initiate a real-time support session (block 1402), at block 1404 the processor 902 sends a request to a session server for one or more session token(s). For example, a session token may be requested and received for each type of session requested by the service terminal 310a, 310b. The session server may be implemented within the queueing system 312 or as a separate system to which the queueing system 312 may connect.

At block 1406, the processor 902 creates session parameters for the support session using the received session token and an identifier of the testing device 100 indicated in the request to initiate the real-time support session. At block 1408, the example processor 902 returns the session parameters, the session token, and the testing device identifier to the requester. The example instructions 1400 may then end and/or iterate to await further requests for real-time support sessions.

The present methods and systems may be realized in hardware, software, and/or a combination of hardware and software. The present methods and/or systems may be realized in a centralized fashion in at least one computing system, or in a distributed fashion where different elements are spread across several interconnected computing systems. Any kind of computing system or other apparatus adapted for carrying out the methods described herein is suited. A typical combination of hardware and software may include a general-purpose computing system with a program or other code that, when being loaded and executed, controls the computing system such that it carries out the methods described herein. Another typical implementation may comprise an application specific integrated circuit or chip. Some implementations may comprise a non-transitory machine-readable (e.g., computer readable) medium (e.g., FLASH drive, optical disk, magnetic storage disk, or the like) having stored thereon one or more lines of code executable by a machine, thereby causing the machine to perform processes as described herein. As used herein, the term "non-transitory machine-readable medium" is defined to include all types of machine readable storage media and to exclude propagating signals.

As utilized herein the terms "circuits" and "circuitry" refer to physical electronic components (i.e. hardware) and any software and/or firmware ("code") which may configure the hardware, be executed by the hardware, and or otherwise be associated with the hardware. As used herein, for example, a particular processor and memory may comprise a first "circuit" when executing a first one or more lines of code and may comprise a second "circuit" when executing a second one or more lines of code. As utilized herein, "and/or" means any one or more of the items in the list joined by "and/or". As an example, "x and/or y" means any element of the three-element set {(x), (y), (x, y)}. In other words, "x and/or y" means "one or both of x and y". As another example, "x, y, and/or z" means any element of the seven-element set {(x), (y), (z), (x, y), (x, z), (y, z), (x, y, z)}. In other words, "x, y and/or z" means "one or more of x, y and z". As utilized herein, the term "exemplary" means serving as a non-limiting example, instance, or illustration. As utilized herein, the terms "e.g.," and "for example" set off lists of one or more non-limiting examples, instances, or illustrations. As utilized herein, circuitry is "operable" to perform a function whenever the circuitry comprises the necessary hardware and code (if any is necessary) to perform the function, regardless of whether performance of the function is disabled or not enabled (e.g., by a user-configurable setting, factory trim, etc.).

While the present method and/or system has been described with reference to certain implementations, it will be understood by those skilled in the art that various changes may be made and equivalents may be substituted without departing from the scope of the present method and/or system. For example, block and/or components of disclosed examples may be combined, divided, re-arranged, and/or otherwise modified. In addition, many modifications may be made to adapt a particular situation or material to the teachings of the present disclosure without departing from its scope. Therefore, the present method and/or system are not limited to the particular implementations disclosed. Instead, the present method and/or system will include all implementations falling within the scope of the appended claims, both literally and under the doctrine of equivalents.

The invention claimed is:

1. A testing device to measure a mechanical property of a material or component, the testing device comprising:
    a computing device configured to obtain a measurement value related to the material or component under test, the computing device comprising:
        an input device;
        a processor; and
        a memory coupled to the processor and storing computer readable instructions which, when executed by the processor, cause the processor to:

in response to first input via the input device, transmit a request for a technical support service to a remote computing system;

perform, at the computing device, one or more remote service actions associated with the technical support service;

enter a support call reception mode by transmitting a request message to the remote computing system; and establish, with a second computing system identified in a support call initiation message, at least one of an audio connection or a remote control connection, in which the support call initiation message is received in response to the request message.

2. The testing device as defined in claim 1, wherein the computer readable instructions, when executed by the processor, further cause the processor to transmit, to the remote computing system, information associated with the one or more remote service actions.

3. The testing device as defined in claim 2, wherein the information associated with the one or more remote service actions comprises at least one of a testing device calibration status, a software version, a serial number of the testing device, operator contact information associated with the testing device, or a service agreement status.

4. The testing device as defined in claim 1, further comprising a microphone and a speaker, wherein the computer readable instructions, when executed by the processor, further cause the processor to use the speaker and the microphone for the audio connection.

5. The testing device as defined in claim 4, wherein the computer readable instructions, when executed by the processor, further cause the processor to establish the audio connection by establishing a voice over Internet protocol (VOIP) session.

6. The testing device as defined in claim 4, wherein the computer readable instructions, when executed by the processor, further cause the processor to establish the remote control connection by establishing an application sharing protocol session via the remote computing system.

7. The testing device as defined in claim 1, wherein the request comprises an Internet protocol (IP) request message.

8. The testing device as defined in claim 1, wherein the testing device is configured to test, for a material under test, at least one of a tensile strength, a compression strength, a flexural strength, a shear strength, an impact strength, a torsional strength, or an adhesion strength.

9. The testing device as defined in claim 1, wherein the computer readable instructions, when executed by the processor, further cause the processor to access a communication received from the remote computing system and associated with the request, the communication identifying the one or more remote service actions to be performed on the computing device, the instructions to cause the processor to perform the one or more remote service actions in response to second input via the user input device.

10. The testing device as defined in claim 1, wherein the computer readable instructions, when executed by the processor, further cause the processor to, prior to the request for the technical support service, establish a data connection to the remote computing system.

11. The testing device as defined in claim 10, wherein the request for the technical support service includes at least one of an identifier of the testing device or an identifier associated with the data connection established between the testing device and the remote computing system.

12. The testing device as defined in claim 1, wherein the computer readable instructions, when executed by the processor, further cause the processor to determine a calibration status of the testing device and, in response to determining that the testing device is due for calibration based on the calibration status, display a notification on the display associated with the calibration status.

13. The testing device as defined in claim 12, wherein the computer readable instructions, when executed by the processor, further cause the processor to, in response to receiving an input via the input device, display an interface to enable an operator of the computing device to schedule a calibration for the testing device.

14. A testing device to measure a mechanical property of a material or component, the testing device comprising:
a computing device configured to obtain a measurement value related to the material or component under test, the computing device comprising:
a display;
an input device;
a processor; and
a memory coupled to the processor and storing computer readable instructions which, when executed by the processor, cause the processor to:
in response to first input via the input device, transmit a request for a technical support service to a remote computing system;
present, via the display, an interface representative of a file system stored on the computing device that permits an operator to select one or more files from the file system; and
in response to a designated input via the input device, transmit the selected one or more files to the remote computing system;
perform, at the computing device, one or more remote service actions associated with the technical support service.

15. A testing device to measure a mechanical property of a material or component, the testing device comprising:
a computing device configured to obtain a measurement value related to the material or component under test, the computing device comprising:
a display;
an input device;
a processor; and
a memory coupled to the processor and storing computer readable instructions which, when executed by the processor, cause the processor to:
in response to first input via the input device, transmit a request for a technical support service to a remote computing system; and
enter a support call reception mode in which the processor can receive a support call initiation message from the remote computing system;
in response to receiving the support call initiation message, display an inbound call alert on the display, the instructions to cause the processor to establish the at least one of the audio connection or the remote control connection in response to receiving, while the inbound call alert is active, an input associated with acceptance of a support call associated with the support call initiation message; and
perform, at the computing device, one or more remote service actions associated with the technical support service.

16. A testing device to measure a mechanical property of a material or component, the testing device comprising:
- a computing device configured to obtain a measurement value related to the material or component under test, the computing device comprising:
  - an input device;
  - a processor; and
  - a memory coupled to the processor and storing computer readable instructions which, when executed by the processor, cause the processor to:
    - in response to first input via the input device, transmit a request for a technical support service to a remote computing system, wherein the request for the technical support service comprises at least one of: a request for a software update for the testing device or a request for a live support session; and
    - perform, at the computing device, one or more remote service actions associated with the technical support service.

17. A testing device to measure a mechanical property of a material or component, the testing device comprising:
- a computing device configured to obtain a measurement value related to the material or component under test, the computing device comprising:
  - a display;
  - an input device;
  - a processor; and
  - a memory coupled to the processor and storing computer readable instructions which, when executed by the processor, cause the processor to:
    - in response to logging in an operator at the computing device, transmit data associated with the testing device to a remote computing system;
    - in response to first input via the input device, transmit a request for a technical support service to a remote computing system;
    - perform, at the computing device, one or more remote service actions associated with the technical support service.

* * * * *